US010038608B2

(12) United States Patent
Thubert et al.

(10) Patent No.: US 10,038,608 B2
(45) Date of Patent: Jul. 31, 2018

(54) LEAPFROG COMMUNICATIONS IN A TSCH NETWORK

(71) Applicant: Cisco Technology, Inc., San Jose, CA (US)

(72) Inventors: Pascal Thubert, La Colle sur Loup (FR); Patrick Wetterwald, Mouans Sartoux (FR); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 631 days.

(21) Appl. No.: 14/336,005

(22) Filed: Jul. 21, 2014

(65) Prior Publication Data

US 2016/0020979 A1    Jan. 21, 2016

(51) Int. Cl.
    *H04J 1/16*        (2006.01)
    *H04L 12/26*     (2006.01)
    *H04L 12/24*     (2006.01)

(52) U.S. Cl.
    CPC ........ *H04L 43/062* (2013.01); *H04L 41/0803* (2013.01); *H04L 43/12* (2013.01); *H04L 41/12* (2013.01); *Y04S 40/162* (2013.01); *Y04S 40/164* (2013.01); *Y04S 40/168* (2013.01)

(58) Field of Classification Search
    CPC ... H04L 43/062; H04L 43/12; H04L 41/0803; H04L 41/12; Y04S 40/162; Y04S 40/164; Y04S 40/168
    USPC ........................................................ 370/252
    See application file for complete search history.

(56) References Cited

U.S. PATENT DOCUMENTS

| 8,626,948 | B2 | 1/2014 | Holmer et al. | |
|---|---|---|---|---|
| 2005/0201349 | A1 | 9/2005 | Budampati | |
| 2010/0226259 | A1* | 9/2010 | Desmond | H04L 1/1803 370/242 |
| 2011/0028140 | A1* | 2/2011 | Dewasurendra | H04B 7/2606 455/422.1 |
| 2011/0072156 | A1* | 3/2011 | Holmer | H04L 45/00 709/241 |

(Continued)

OTHER PUBLICATIONS

Dujovne et al. "6TiSCH On-The-Fly Scheduling draft-dujovne-6tisch-on-the-fly-02"; Feb. 14, 2014, pp. 1-10.

(Continued)

*Primary Examiner* — Peter Cheng
(74) *Attorney, Agent, or Firm* — Parker Ibrahim & Berg LLP; James M. Behmke; Stephen D. LeBarron

(57) ABSTRACT

In one embodiment, a network node monitors communications between a sender node and an intermediary receiver node during a set of time slots of a channel hopping schedule. The sender node, intermediary receiver node, and a final destination node for the communications may all be located along a primary communication path in the network. The network node stores a copy of one of the communications sent from the sender node to the intermediary receiver node during a particular time slot in the set of time slots. The network node forwards the copy of the communication to a listener node configured to monitor communications between the intermediary receiver node and another node located along the primary communication path. The intermediary receiver node is also configured to monitor communications between the network node and the listener node.

24 Claims, 22 Drawing Sheets

(56) References Cited

U.S. PATENT DOCUMENTS

2016/0021599 A1\* 1/2016 Fitzek ................. H04L 12/6418
370/310

OTHER PUBLICATIONS

Thubert el al. "An Architecture for IPv6 over the TSCH mode of IEEE 802.15.4e draft-ietf-6tisch-architecture-03"; Jul. 4, 2014, pp. 1-30.
Vilajosana et al. "Minimal 6TiSCH Configuration draft-ietf-6tisch-minimal-02"; Jul. 4, 2014, pp. 1-20.
Palattella et al. "Terminology in IPv6 over the TSCH mode of IEEE 802.15.4e draft-ietf-6tisch-terminology-02"; Jul. 4, 2014, pp. 1-12.
Watteyne et al. "Using IEEE802.15.15.4e TSCH in an LLN context: Overview, Problem Statement and Goals draft-ietf-6tisch-tsch-01"; Jul. 4, 2014, pp. 1-22.
Couto et al. "ETX-High Throughput Metric"; CSE 291D—Spring 2007 UCSD, pp. 1-16.

\* cited by examiner

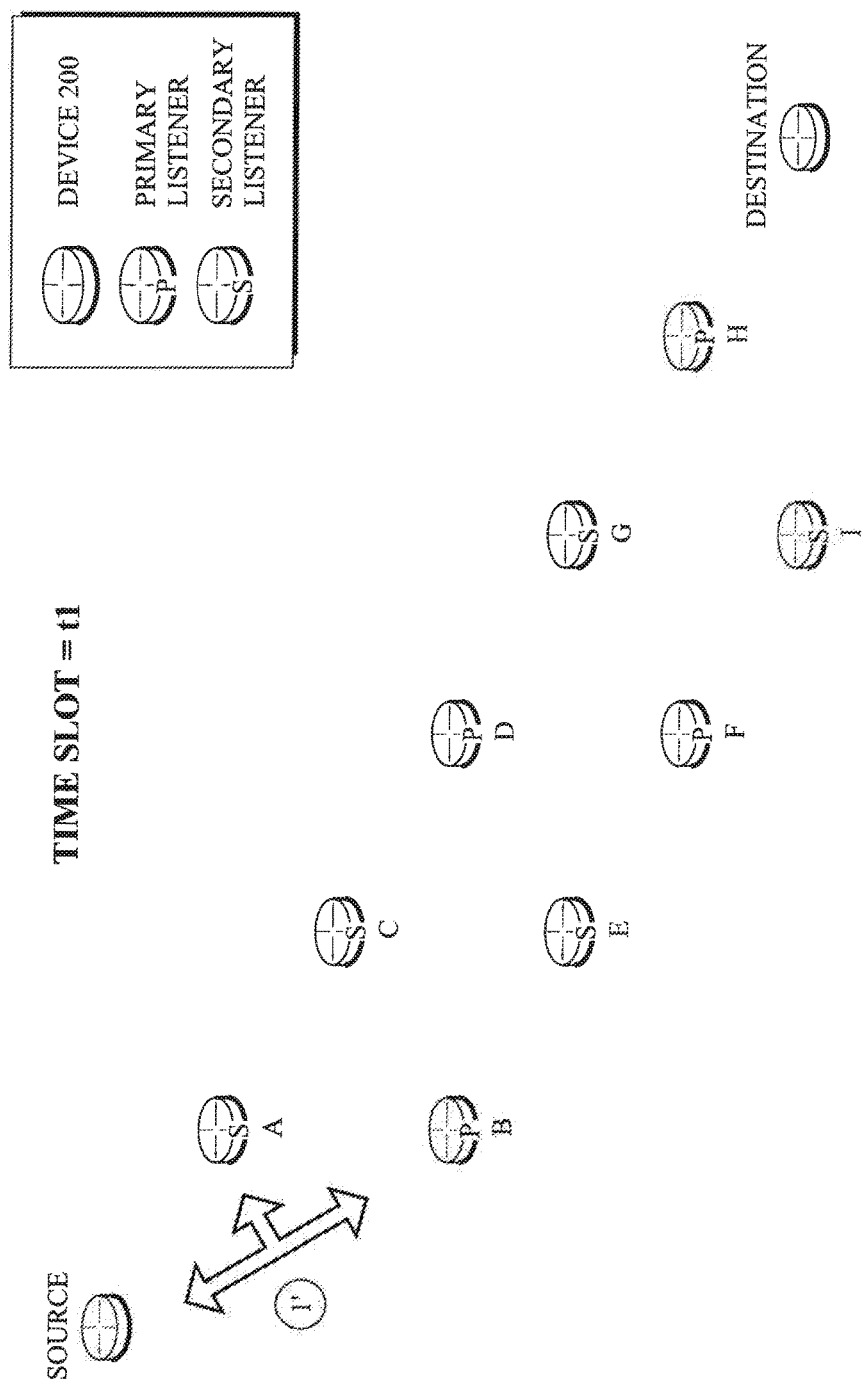

LEAPFROG COMMUNICATIONS IN A TSCH NETWORK

TECHNICAL FIELD

The present disclosure relates generally to computer networks, and, more particularly, to leapfrog communications in a time slotted channel hopping (TSCH) network.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

Low power and lossy networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. Changing environmental conditions may also affect device communications in an LLN. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 9A-9J illustrate an example leapfrog communication process for TSCH networks.

DESCRIPTION OF EXAMPLE EMBODIMENTS

Overview

Figure 1:
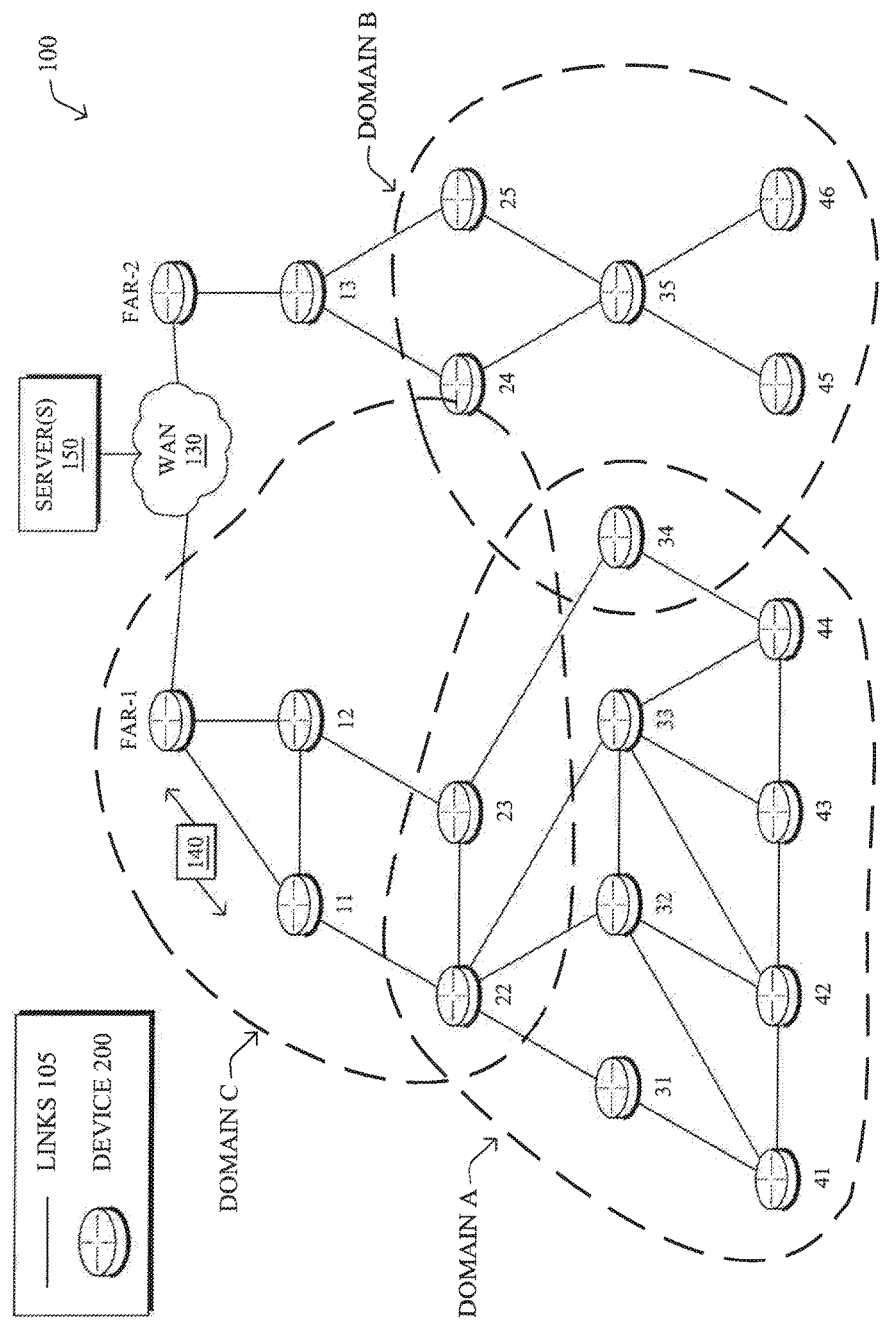
FIG. 1 illustrates an example communication network.

According to one or more embodiments of the disclosure, a network node monitors communications between a sender node and an intermediary receiver node during a set of time slots of a channel hopping schedule. The sender node, intermediary receiver node, and a final destination node for the communications may all be located along a primary communication path in the network. The network node stores a copy of one of the communications sent from the sender node to the intermediary receiver node during a particular time slot in the set of time slots. The network node forwards the copy of the communication to a listener node configured to monitor communications between the intermediary receiver node and another node located along the primary communication path. The intermediary receiver node is also configured to monitor communications between the network node and the listener node.

In further embodiments, a device calculates a probability of successful transmission between a sender node and a receiver node located along a primary communication path. The device determines that the calculated probability of successful transmission is below a threshold value. In response to determining that the probability of successful transmission is below the threshold value, the device identifies a set of one or more potential listener nodes within communication range of the sender node. The device instructs a particular listener in the identified set to monitor communications between the sender node and the receiver node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "FAR-1," "FAR-2," and "11," "12," . . . "46," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains AC) in which nodes 200 may communicate.

Figure 2:
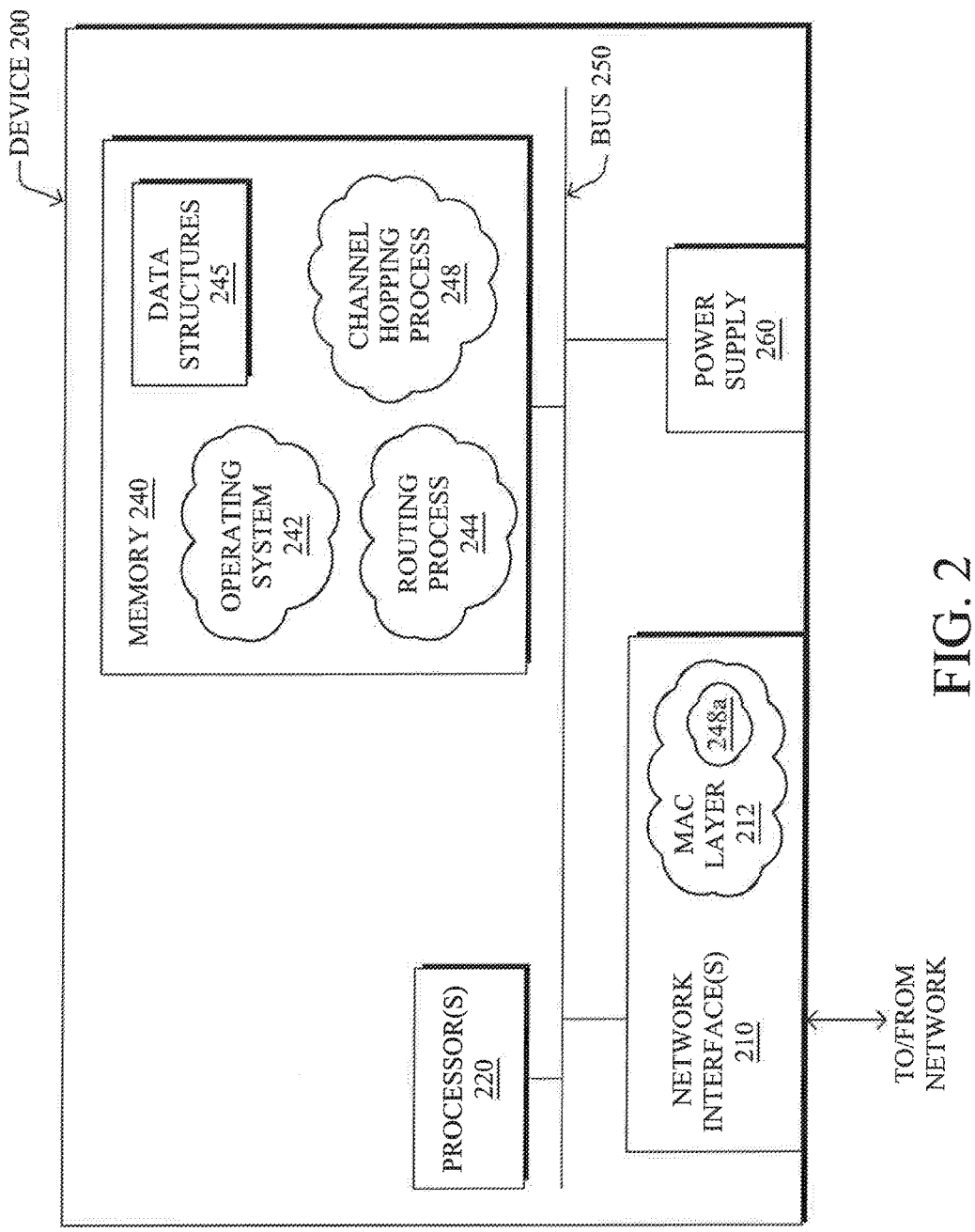
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, include the mechanical, electrical and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches), The processor 220 may include hardware elements or hardware logic configured to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, and an illustrative channel hopping process 248 as described in greater detail below. Note that while channel hopping process 248 is shown in centralized memory 240, alternative embodiments provide for the process to be specifically operated within the network interfaces 210, such as within a MAC layer 212 (as "process 248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

According to various embodiments, routing process 244 and/or channel hopping process 248/248a may utilize machine learning techniques, to predict a future state of the network (e.g., predict routing changes, predict time slot usage by nodes, etc.). In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.).

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al, (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012). Further, an example OF (e.g., a default OF) may be found in an IETF RFC, entitled "RPL Objective Function 0" <RFC 6552> by Thubert (March 2012) and "The Minimum Rank Objective Function with Hysteresis" <RFC 6719> by O. Gnawali et al. (September 2012).

Building a DAG may utilize a discovery mechanism to build a logical representation of the network, and route dissemination to establish state within the network so that routers know how to forward packets toward their ultimate destination, Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a. DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
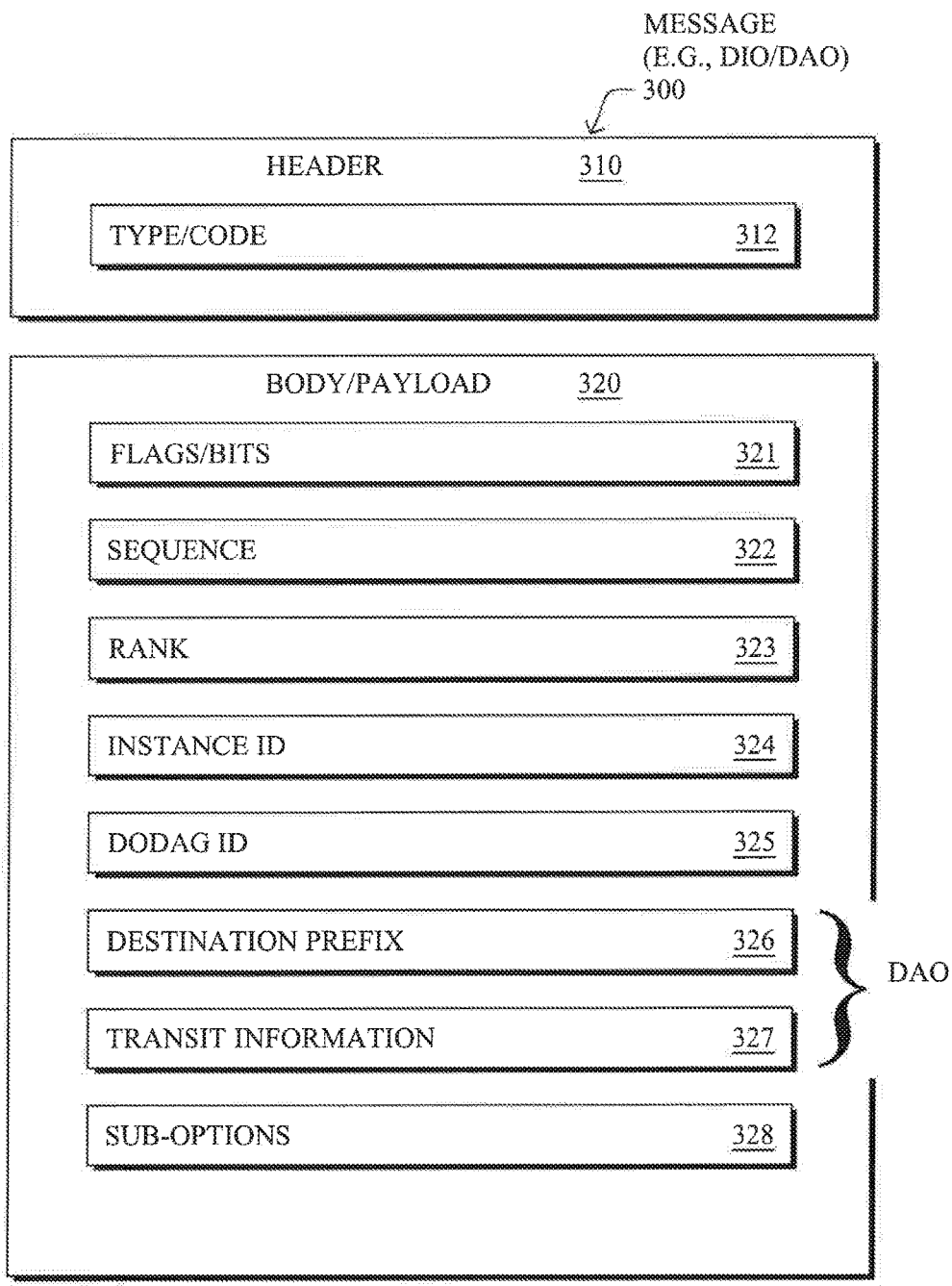
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
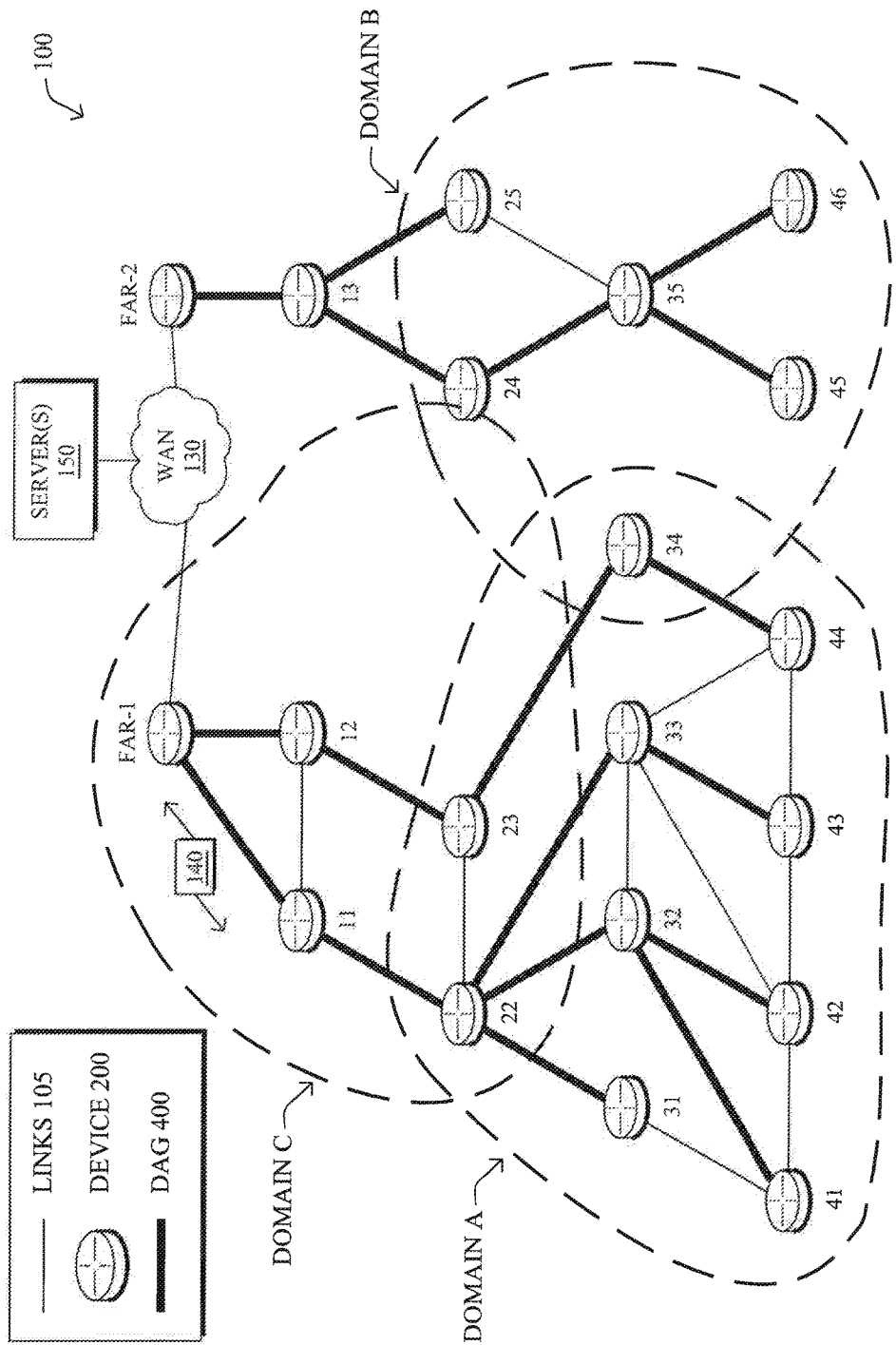
FIG. 4 illustrates an example directed acyclic graph (DAG) in the communication network of FIG. 1.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 400 (shown as bolded lines), which extends from the root node toward one or more leaf nodes (nodes without children). Traffic/packets 140 (shown in FIG. 1) may then traverse the DAG 400 in either the upward direction toward the root or downward toward the leaf nodes, particularly as described herein.

According to various embodiments, communications within network 100 may be deterministic, Notably, low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH". The centralized computation is typically done by a PCE with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol (RFC6550). The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.)

For the underlying MAC operation, 6TiSCH relies, as its name shows, on time slotted channel hopping (TSCH). More specifically, 6TiSCH is being designed for the IEEE802.1.5.4e TSCH mode of operation. This is the standardized version of the MAC that was adopted by all industrial WSN standards, ISA100.11 a, WirelessHART and WIAPA.

The time slotted aspect of the TSCH technology is a time division multiplexing (TDM) technique, which requires all nodes in the network to be time synchronized. In other words, time is sliced up into time slots with a given time slot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) time slot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and time slots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Figure 5:
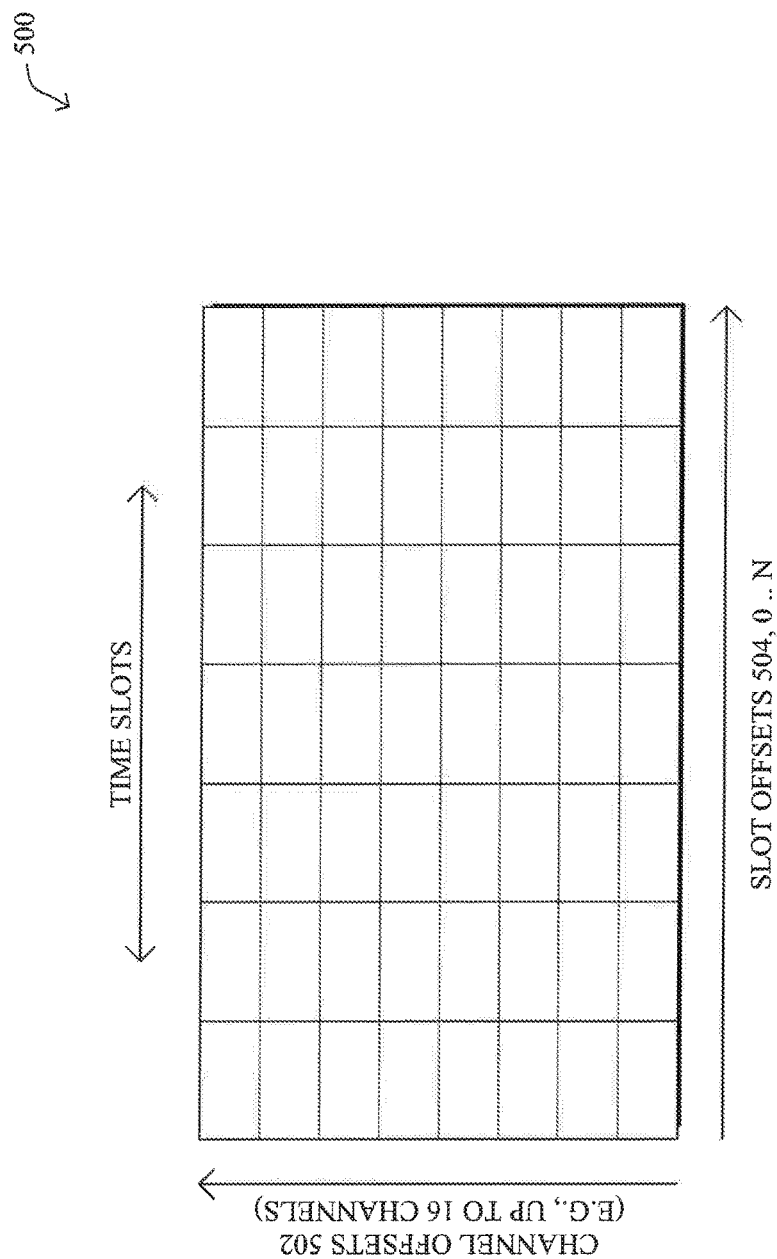
FIG. 5 illustrates an example channel distribution/usage (CDU) matrix.

Referring now to FIG. 5, an example channel distribution/usage (CDU) matrix 500 is shown that may be used by the nodes/devices 200 in network 100. Notably, 6TiSCH defines a new global concept of a CDU matrix that may repeat itself over time and represents the global characteristics of the network such as used/unused channels, time slot durations, number of time slots per iteration, etc. As shown, CDU matrix 500 may include an index of channel offsets 502 along a first axis that correspond to the channels available for use in network 100 (e.g., offsets for each of sixteen available channels). As would be appreciated, any number of channels may be used in the network. Along the other axis are slot offsets 504 that correspond to differing time slots, the combination of which is equal to one period of the network scheduling operation.

CDU matrix 500 may be used to define the basic wireless communication operations for the network. For example, CDU matrix 500 may be used to define the duration of a time slot (e.g., between 10 to 15 ms), the period of an iteration (e.g., the total number of time slots, indexed by slot offsets 504), and the number of channels (e.g., indexed by channel offset 502) to which the MAC may jump.

A "cell" in CDU matrix 500 is defined by the pair (slot offset, channel offset) in the epochal description of CDU matrix 500, in other words, at time t=0. During runtime, the actual channel at which a given transmission happens may be rotated to avoid interferences such as self-inflicted multipath fading.

Figure 6:
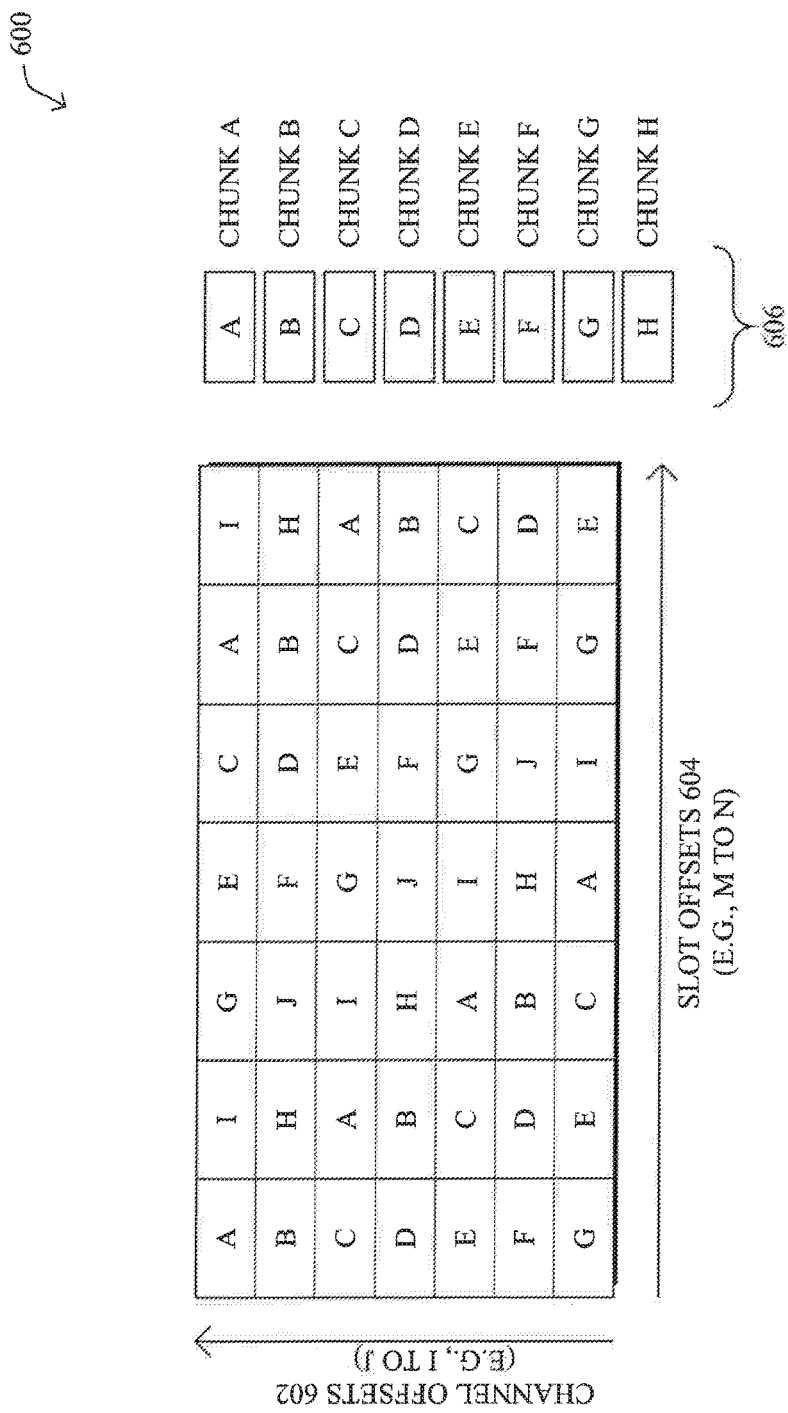
FIG. 6 illustrates example chunks of the CDU matrix of FIG. 5.

Referring now to FIG. 6, an example subset 600 of CDU matrix 500 is shown to be divided into chunks 606. In order to scale the network, the computation of the channel hopping schedule for the network may be distributed. According to some embodiments, such as those in which 6TiSCH is used, a parent node (e.g., an RPL parent) may be responsible for computing the schedule between the parent and its child node(s) in both directions. In order to allocate a cell for a given transmission, the parent node must be certain that this cell will not be used by another parent in the interference domain. As shown, for example, cells within CDU matrix 500 may be "owned" by different parent nodes within the network. The collective cells of CDU matrix 500 assigned to different parent nodes may then be grouped together as chunks 606. In one implementation, for example, CDU matrix 500 may be formatted into chunks by making a full partition of matrix 500. The resulting partition must be well known by all the nodes in the network, to support the appropriation process, which would rely on a negotiation between nodes within an interference domain.

Typically, there will be at most one cell in a chunk per column of CDU matrix 500, to reflect that a device with a single radio may not use two channels at the same time. The cells may also be well distributed in time and frequency, so as to limit the gaps between transmissions and avoid the sequential loss of frames in multipath fading due to the consecutive reuse of a same channel.

Chunks 606 may be defined at the epochal time (e.g., at the time of creation of CM matrix 500) and the 802.15.4e operation may be repeated iteratively any number of times. Typically, the effective channel for a given transmission may be incremented by a constant that is prime with the number of channels, modulo the number of channels at each iteration. As a result, the channel of a given transmission changes at each iteration and the matrix virtually rotates.

Figure 7:
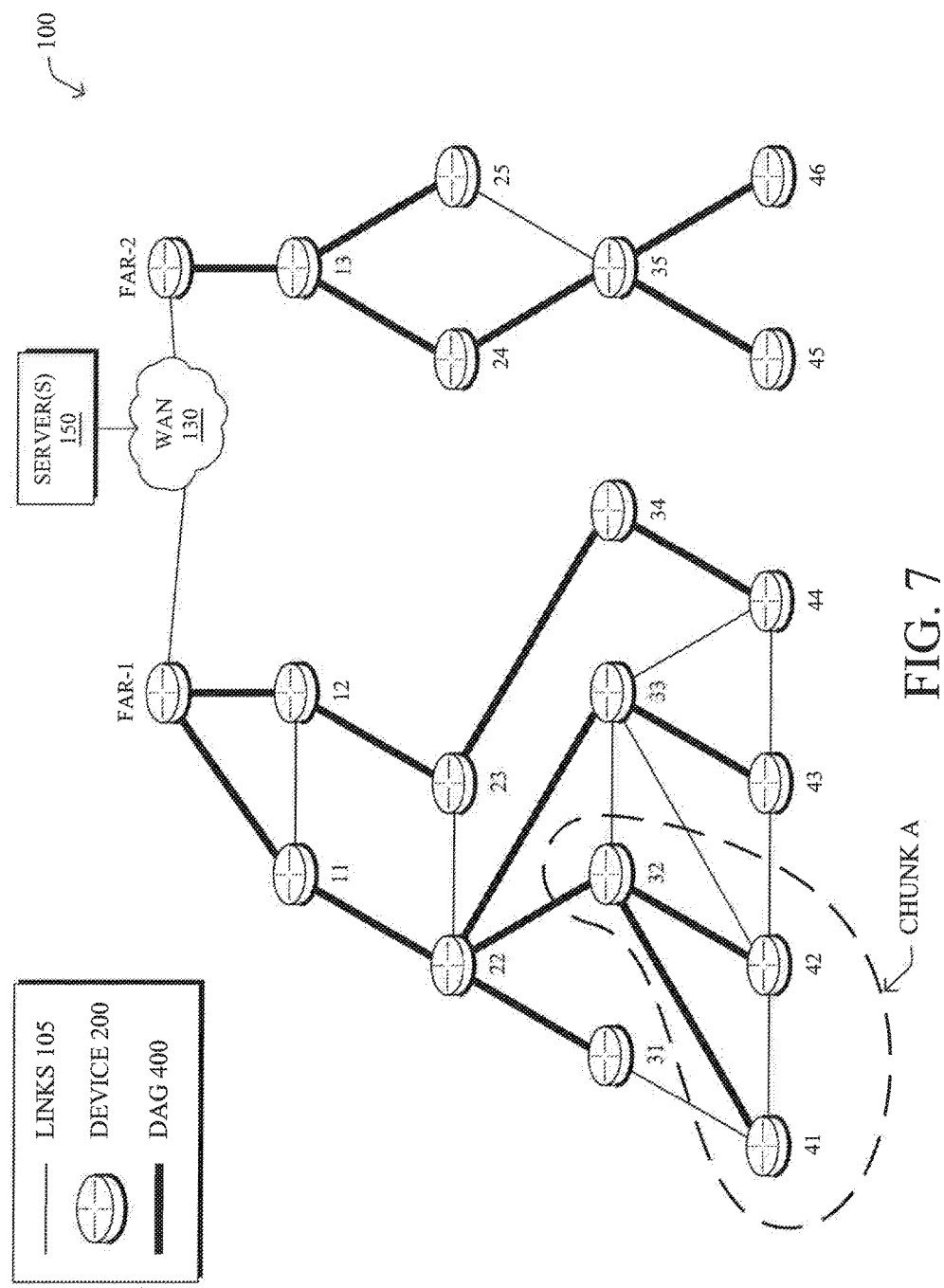
FIGS. 7-8 illustrate examples of a parent node in the network of FIG. 1 scheduling communications for a particular chunk.
Figure 8:
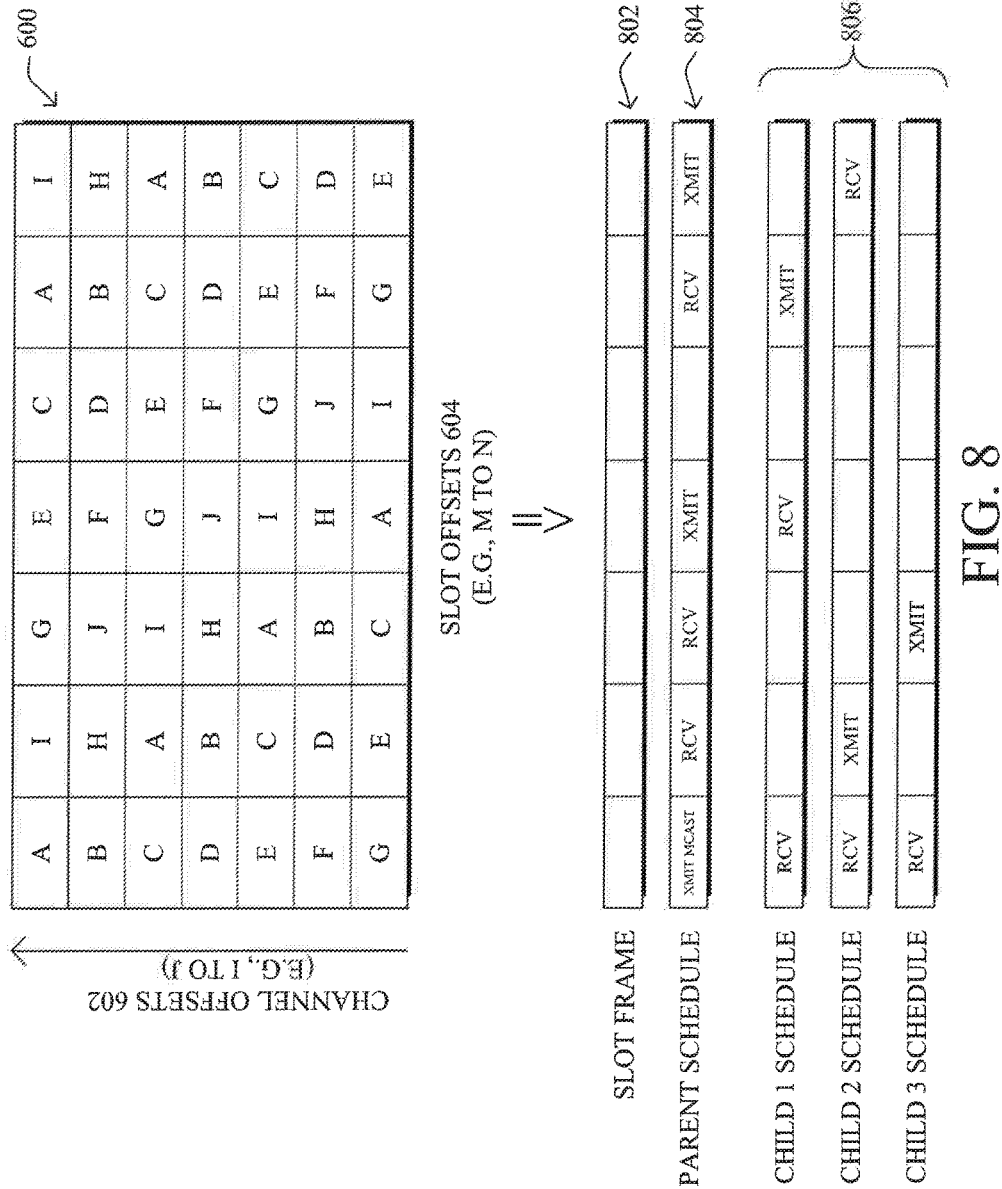

FIGS. 7-8 illustrate examples of a parent node in the network of FIG. 1 scheduling communications for a particular chunk. As shown, assume that node 32 is the parent node of child nodes 41, 42 according to the routing protocol. Node 32 may be assigned a chunk (e.g., chunk A) of CDU matrix 500, thereby allowing node 32 to manage the usage of the corresponding cells in the chunk within its interference domain, Thus, node 32 may decide which transmissions will occur over the cells in the chunk between itself and its child node(s). Ultimately, a chunk represents some amount of bandwidth and can be seen as the generalization in the time/frequency domain of the classical channel that is used to paint a wireless connectivity graph, e.g. to distribute TV frequencies over a country or WiFi channels in an ESS deployment.

If chunks are designed to form a partition of the CDU matrix 500, multiple different chunks may be in use in the same area of network 100 and under the control of different parents. In one embodiment, the appropriation process may be such that any given node that communicates using cells in a given chunk, as appropriated and managed by a parent A, should not be within the interference domain of any other node that is also communicating using the same chunk but appropriated and managed by a different parent B. Consequently, the number of parents in any given area of the network may be constrained by the number of chunks.

Referring more specifically to FIG. 8, parent node 32 may use a slot frame 802 to assign hopping schedules 804, 806 to itself and any of its child, node(s), respectively. Generally speaking, slot frame 802 is a MAC-level abstraction that is also internal to the node and includes a series of time slots of equal length and priority. For example, the size of the slot frame 802 may match the CDU matrix 500. Parent node 32 may use slot frame 802 to divide the corresponding times into slots and associate the slots to a particular operation (e.g., reception, transmission, multicast operation, etc.). For example, as shown, parent node 32 and one of its child nodes may be synchronized to use the same channel during a given time slot.

Slot frame 802 may be characterized by a slotframe_ID, a slot duration, and a slotframe_size. In some implementations, multiple slot frames may coexist in a node's schedule. In other words, a node can have multiple activities scheduled in different slot frames, based on the priority of its packets/traffic flows. The different slot frames may be implemented as having the same durations/sizes or different durations/sizes, in various cases. The time slots in the slot frame may also be indexed by the slot offsets 604 (e.g., the first time slot in slot frame 802 may be indexed as slot offset 0, etc.).

In various implementations, different parent nodes may appropriate different chunks such that the chunks used throughout the network do not interfere. For example, chunks may be appropriated by different parent nodes such that, for a given chunk, the domains do not intersect. In addition, the domains for different chunks are generally not congruent since the chunks are owned by different nodes. As a result, the schedule in a node with a single radio is a series of transmissions, and the parent to child cells are taken from (one of) the chunk(s) that the parent has appropriated.

6TiSCH also defines the peer-wise concept of a "bundle," that is needed for the communication between adjacent nodes. In general, a bundle is a group of equivalent scheduled cells (e.g., cells identified by different slot offset/ channel offset pairs), which are scheduled for a same purpose, with the same neighbor, with the same flags, and the same slot frame. The size of the bundle refers to the number of cells it includes. Given the length of the slot frame, the size of the bundle also translates directly into bandwidth, either logical or physical. Ultimately a bundle represents a half-duplex link between nodes, one transmitter and one or more receivers, with a bandwidth that amount to the sum of the time slots in the bundle. Adding a time slot in a bundle increases the bandwidth of the link.

Track forwarding is the simplest and fastest forwarding model defined in the 6TiSCH architecture that specifies IPv6 over TSCH. In general, a "track" is defined as an end-to-end succession of time slots, with a particular time slot belonging to at most one track. In this model, a set of input cells (time slots) are uniquely bound to a set of output cells, representing a forwarding state that can be used regardless of the upper layer protocol. This model can effectively be seen as a G-MPLS operation in that the information used to switch is not an explicit label, but rather related to other properties of the way the packet was received, a particular cell in the case of 6TiSCH. As a result, as long as the TSCH MAC (and Layer 2 security) accepts a frame, that frame can be switched regardless of the protocol, whether this is an IPv6 packet, a 6LoWPAN fragment, or a frame from an alternate protocol such as WirelessHART of ISA100.11a.

For a given iteration of a slotframe, the time slot is associated uniquely with a cell, which indicates the channel at which the time slot operates for that iteration. A data frame that is forwarded along a track has a destination MAC address set to broadcast or a multicast address depending on MAC support. This way, the MAC layer in the intermediate nodes accepts the incoming frame and the 6 top sublayer switches it without incurring a change in the MAC header. In the case of IEEE802.15.4e, this means effectively broadcast, so that along the Track the short address for the destination is set to broadcast, 0xFFFF. Conversely, a frame that is received along a track with a destination MAC address set to this node is extracted from the track stream and delivered to the upper layer. A frame with an unrecognized MAC address may be ignored at the MAC layer and thus is not received at the 6 top sublayer.

As noted above, communication links between nodes in LLNs and other forms of networks may be lossy. For example, some LLNs may exhibit loss rates between 10-20%, if not higher. In certain applications, such as when determinism is implemented in the network, each time slot of the TSCH schedule may be assigned one or more retransmit time slots, to account for the loss of packets. However, this approach may lead to unnecessary transmissions in the network. For example, if an acknowledgement is lost, as opposed to the data frame itself, the data frame may be retransmitted unnecessarily. Such a situation is typical with asymmetric links. In addition, retransmissions may be required at each hop before the next hop is attempted, to avoid slots fanning out. However, doing so also increases latency within the network. Further, losing a data frame wastes energy with no forward progress made in the communication. In LLNs and other networks in which battery powered nodes are typically used, the lifespan of the network itself may be adversely affected.

Leapfrog Communications in a TSCH Network

The techniques herein generally provide for a track forwarding mechanism that attempts to reach a node that is too far away to be selected for expected transmission count (ETX) based forwarding. In some aspects, one or more nodes along the way may listen promiscuously to a data frame that is forwarded along the communication path. The promiscuous listeners may ensure that a packet may still prowess by at least a short step, if the data frame is lost for the long distance transmission along the original route.

Specifically, according to one or more embodiments of the disclosure as described in detail below, a network node monitors communications between a sender node and an intermediary receiver node during a set of time slots of a channel hopping schedule. The sender node, intermediary receiver node, and a final destination node for the communications may all be located along a primary communication path in the network. The network node stores a copy of one of the communications sent from the sender node to the intermediary receiver node during a particular time slot in the set of time slots. The network node forwards the copy of the communication to a listener node configured to monitor communications between the intermediary receiver node and another node located along the primary communication path. The intermediary receiver node is also configured to monitor communications between the network node and the listener node.

Illustratively, the techniques described herein may be performed by hardware, software, and/or firmware, such as in accordance with the channel hopping process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols (e.g., IEEE 802.15.4e 6TiSCH, etc.), and as such, may be processed by similar components understood in the art that execute those protocols, accordingly.

Operationally, a leapfrog mechanism is disclosed that ensures that a packet makes at least some forward progress at every transmission. The leapfrog mechanism also ensures that every transmission is done with frequency, spatial, and time diversity (e.g., on a different channel, between different peers, and/or at different times than along the primary route). In some implementations, the leapfrog mechanism may replace a traditional automatic repeat request (ARQ) mechanism, in some embodiments, although it may still make use of the acknowledgement frame of the ARQ mechanism, in other embodiments.

As described above, a PCE may be used within a TSCH network (e.g., 6TiSCH, etc.) to compute a primary communication path (e.g., a sequence of hops) between a source node and a final destination node. In some embodiments, a redundancy parameter n may be defined such that the PCE ensures that the next n hops $N_1 \ldots N_n$ from any node $N_0$ are within reception range of $N_0$ with a probability of at least a predefined threshold $P_{min}$. Illustratively, the redundancy parameter is may be set between a value of 2 and 4 (e.g., to provide between one and three promiscuous backup listeners), but any other value may also be used in other implementations. The value of redundancy parameter n may be set administratively (e.g., by a network administrator), automatically by a learning machine configured to adapt to a particular use case (e.g., based on observations regarding network conditions), or in any other way, according to various embodiments. In one embodiment, the PCE may also ensure that the probability for a successful transmission from node $N_0$ to the next hop node $N_1$ is more than a predefined threshold $P_{hop}$. For example, assume that $P_i$ is the reception probability that node $N_i$ will receive a transmission by $N_0$ with i≤n. Typically, the reception probability decreases as the distance between the nodes increases such that $P_1 \geq P_2 \geq \ldots \geq P_n$, with the condition that $P_n \geq P_{min}$. In addition, the condition that $P_1 \geq P_{hop} \geq P_{min}$ may also be imposed by the PCE, in one embodiment. In various embodiments, the reception probability may be based on any number of factors such as the physical distance between nodes, the transmission power level, the amount of interference between nodes, a packet loss rate, or any other metrics that may be used to calculate how likely a packet is to reach a particular node.

When the leapfrog mechanism is used, typically only one transmission is attempted by any node $N_0$ for a given frame. The time slot for that transmission may be programmed into the TSCH schedule of $N_0$ as a transmit time slot and into the TSCH schedule of receiver node $N_n$ as a classical receive slot. According to various embodiments, the corresponding time slot may also be used by any or all nodes $N_1$-$N_{n-1}$ between sender node $N_0$ and receiver node $N_n$ as a promiscuous listen time slot. In other words, the time slot may be the first opportunity for receiver node $N_n$ to receive the frame, but is also typically the least probable time slot for the frame to be received by this node.

In one embodiment, a node may listen to all the time slots for which it is a receiver node or as a promiscuous listener node until it actually receives the frame. The node may then send the frame during its own scheduled transmit time slot. In some cases, the node may also refrain from waking for other redundant transmissions outside of its receive, promiscuous listen, or transmit time slots. Such an approach may increase reliability, but at the cost of extra traffic and energy use, since the node always attempts to forward the frame.

In another embodiment, a subset of the nodes between a sending node and a final destination node may be declared primary nodes (e.g., every 1 out of j nodes) and one or more other nodes between the source and final destination declared secondary nodes. In this configuration, a secondary node may only forward a frame if it did not promiscuously listen to an acknowledgement from the intended receiver node in the transmission. In other words, the secondary node may only forward a frame if, to the best knowledge of the secondary node, the secondary node was the farthest node reached by the frame, FIGS. 9A-9J illustrate an example leapfrog communication process for TSCH networks, according to various embodiments. In the example shown, the redundancy parameter n has been set to n=2 such that there is one promiscuous listener associated with each attempted transmission along the primary communication path. In other implementations, additional listeners may be added by increasing the redundancy parameter accordingly. As shown, a PCE or other network device may select a primary communication path that includes intermediary nodes B, D, F, H, and a final destination node. These nodes may be selected, in some embodiments, such that the probability that the next closest node along the path will receive the data frame is greater than the threshold probability $P_{min}$.

In addition to the primary nodes shown, nodes A, C, E, G, and I may be selected by the PCE as secondary listener nodes. In some embodiments, the secondary listener nodes may be selected such that the probability of a particular secondary node receiving a transmission between two primary nodes is greater than a threshold $P_{hop}$. For example, assume that secondary listener node C has a higher probability of receiving a transmission from node B than node D does (e.g., node C receives a higher signal strength from node B than node D receives from node B). Each of the secondary listener nodes may be assigned promiscuous listen time slots that correspond to the transmit/receive time slot used by two primary nodes to forward the frame.

Figure 9A:
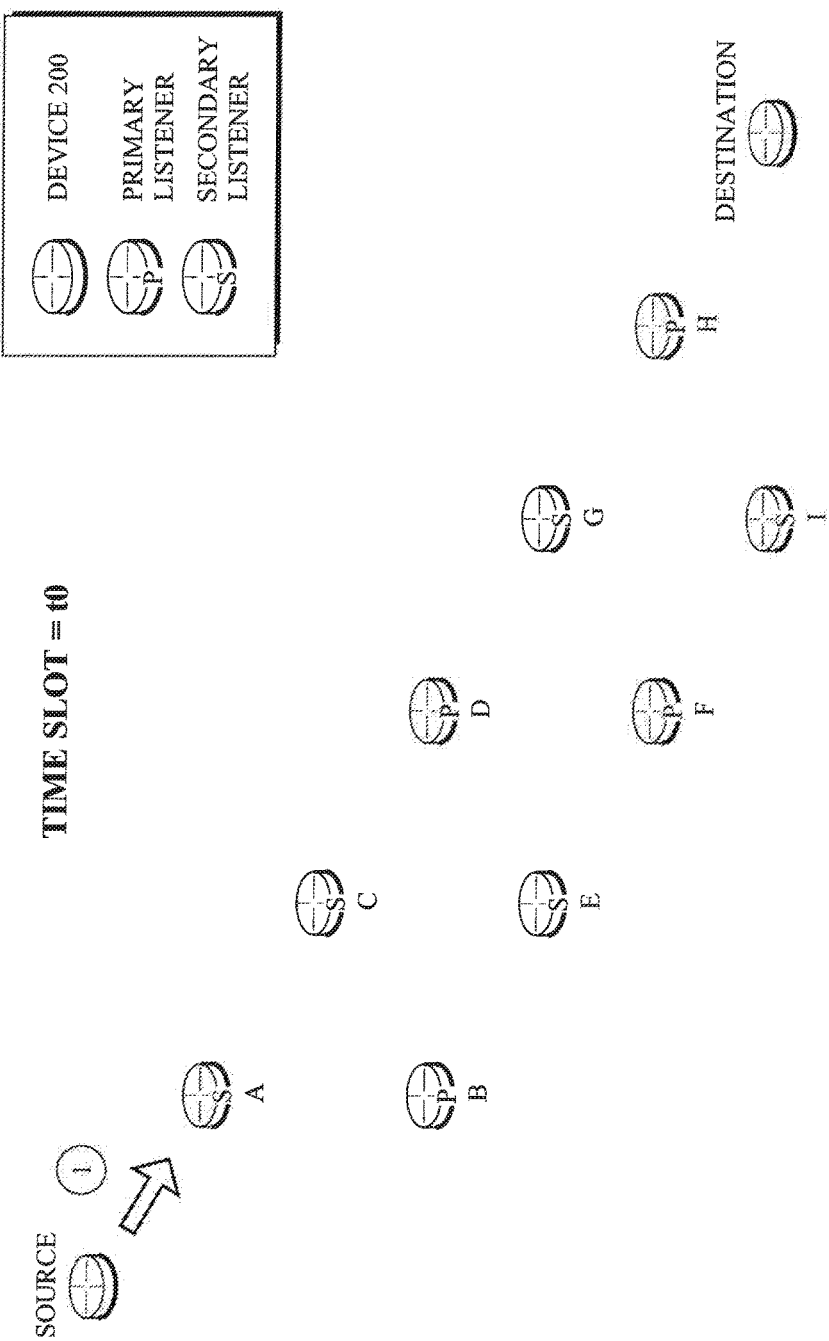

In one embodiment, as shown in the example of FIG. 9A, the source node may optionally send the data frame directly to secondary node A at a time slot t0. In doing so, this ensures that secondary listener node A also has the data frame, creating a redundancy of the data frame.

As shown in FIG. 9B, assume that time slot t1 has been assigned to the source node as a transmit time slot, to primary node B as a receive time slot, and to secondary listener node A as a promiscuous listen time slot. In other words, node A may promiscuously listen in to a message sent from the source node to primary node B during the time slot (e.g., a unicast message, etc.). Any frame sent from the source node to primary node B during time slot t1 that is heard by secondary listener node A may then be copied and stored by listener node A for later use. For example, say that $P_{min}$ and $P_{hop}$ have been set to be 33% and 80%, respectively. With these numbers, 66 frames out of 100 sent by the source node may fail to reach primary node B and 34 out of the 100 frames may reach node B. Also, assume that the spatial diversity between the nodes (e.g., nodes A and B do not suffer from the same multipath interference from the source node) is such that the reception probabilities for the two nodes are uncorrelated and that approximately 53 of these 66 frames are reached by node A (e.g., 66*0.8=52.8). Notably, by directly sending the frames from the source node to node A beforehand, as shown in FIG. 9A, node A may only promiscuously listen in during time slot t1 based on a determination that it did not already receive the frame directly from the source node during time slot t0.

Figure 9C:
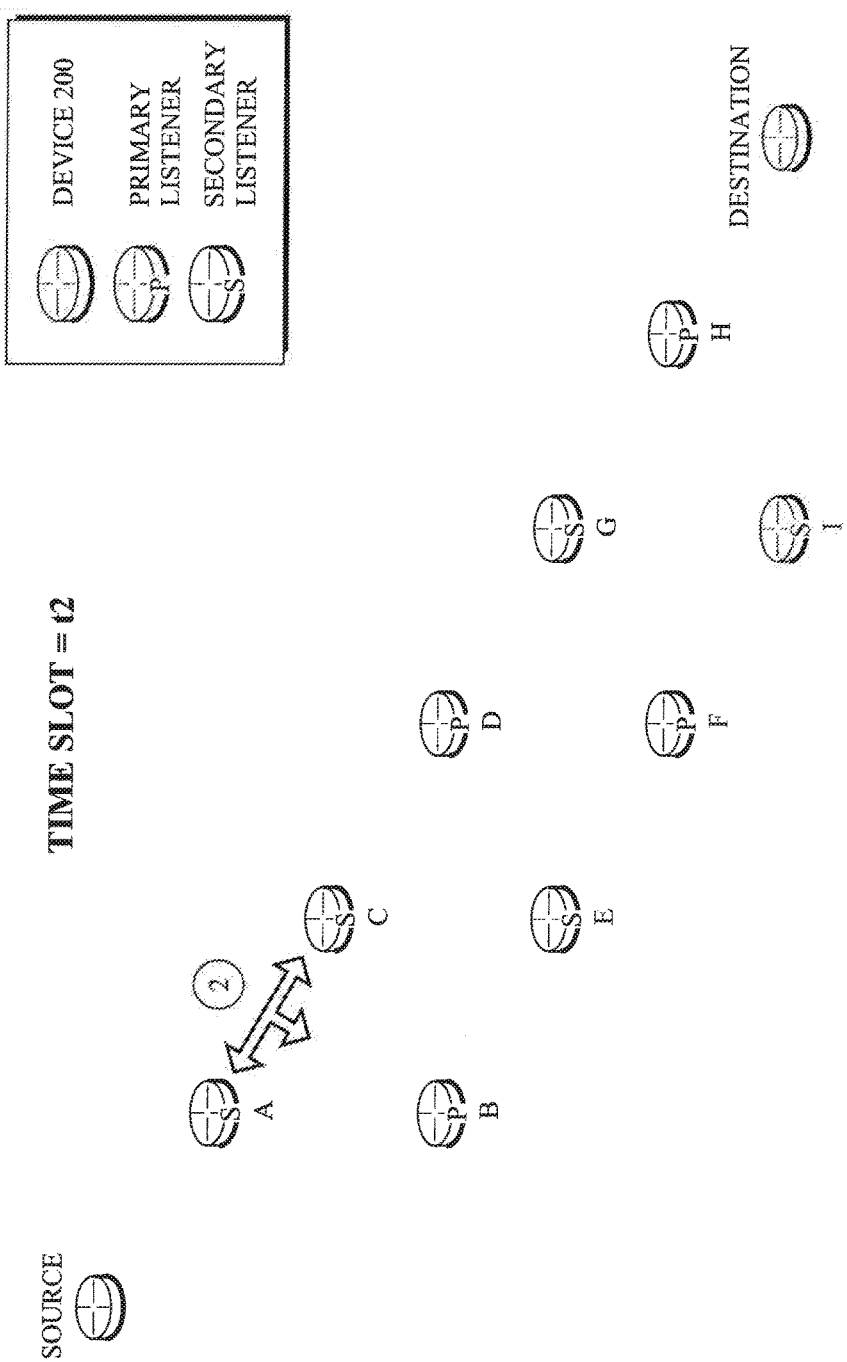

As shown in FIG. 9C, secondary listener node A may forward the frames it received from the source node to secondary listener node C during a time slot t2. In some embodiments, node A may only forward frames to node C that were not acknowledged by node B back to the source node (e.g., node A may listen for an acknowledgement from node B indicating that node B received the frame). In other embodiments, node A may forward the frame to node C, regardless of its reception status at node B.

During time slot t2, primary listener node B may be configured to promiscuously listen to the transmission from node A to node C. Assume, for example, that the probability of node B hearing the transmission from node A to node C has a probability of 80%. In such a case, node B may receive approximately 42 out of 100 frames originally sent by the source node, by listening promiscuously to the transmission between nodes A and C (e.g., 53 frames received by node A*80%=42.4 frames). Thus, it can be seen that node B may receive up to approximately 42+34=76 of the 100 frames originally sent by the source node. In comparison, a pure hop-by-hop system with 80% reception probabilities would result in only 64 out of 100 frames being received (e.g., 0.8*0.8*100=64) at this point.

As would be appreciated, if node A transmits to node C while node B is listening promiscuously to the transmission, then when node B transmits to node D, the frame will be resent on a different channel and from a different and typically closer location, meaning that node C will have a greater chance of receiving the frame than if node A had simply retried sending the frame. In other words, the leapfrog mechanism may also provide both spatial and time diversity.

Figure 9D:
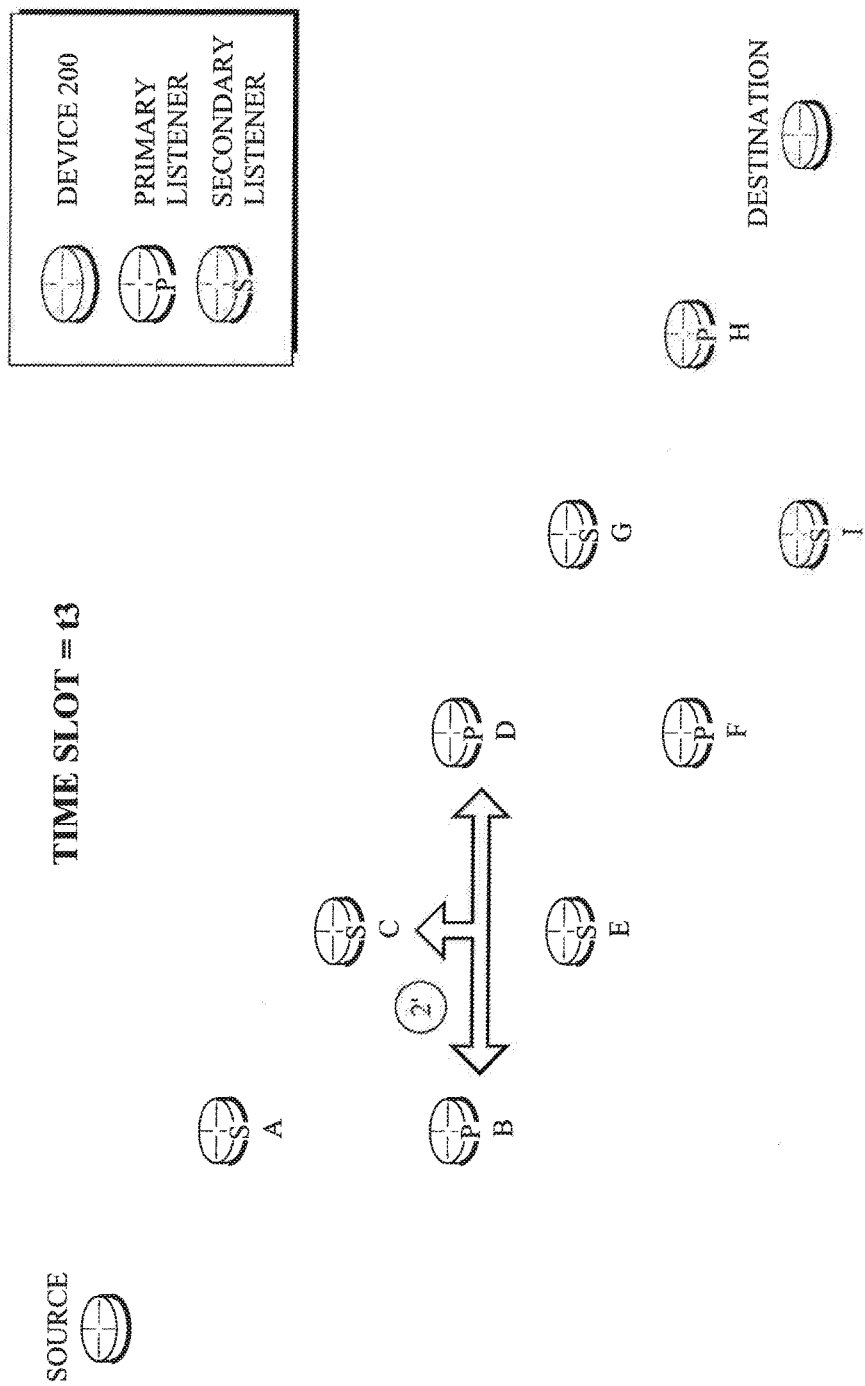
Figure 9E:
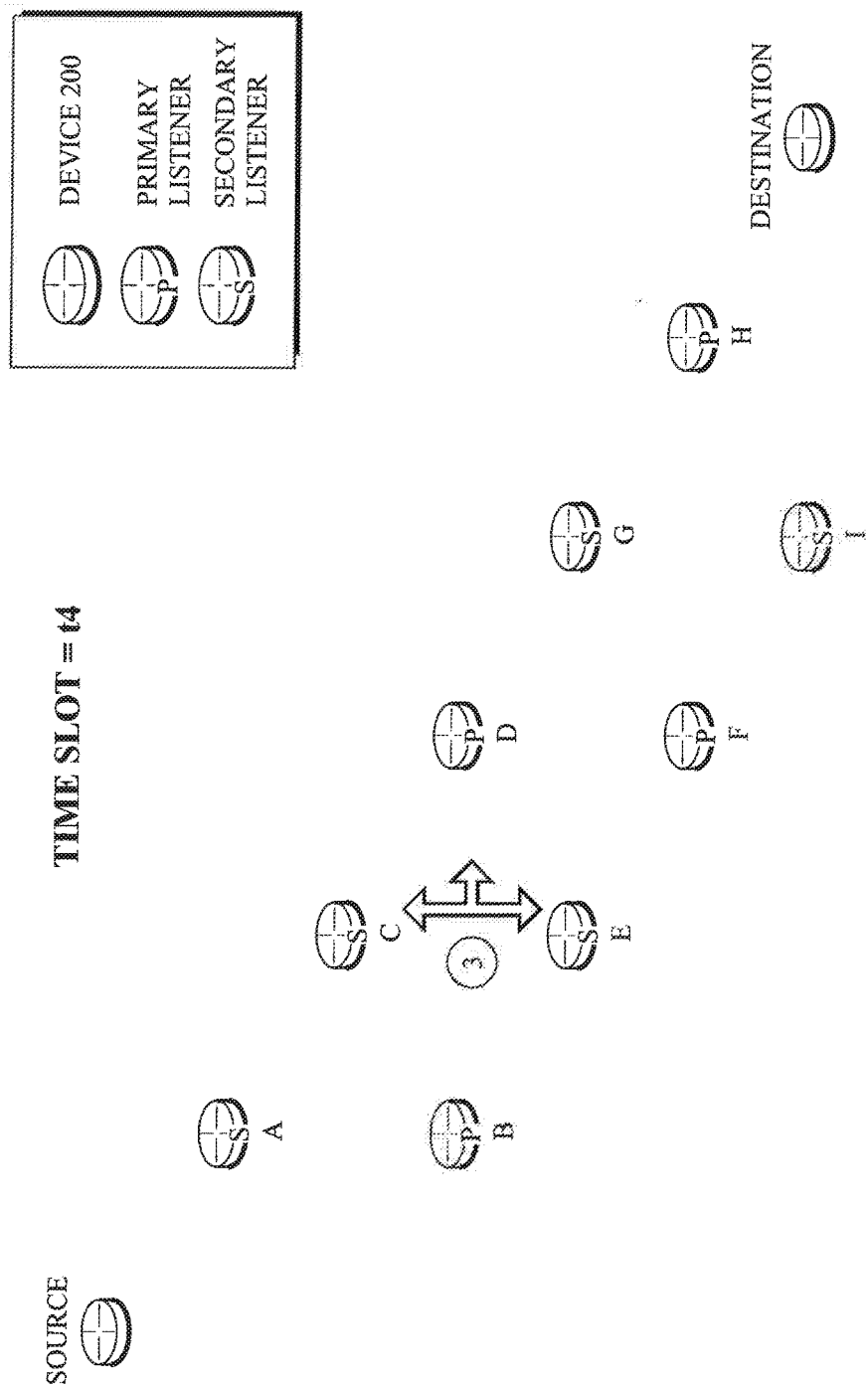
Figure 9F:
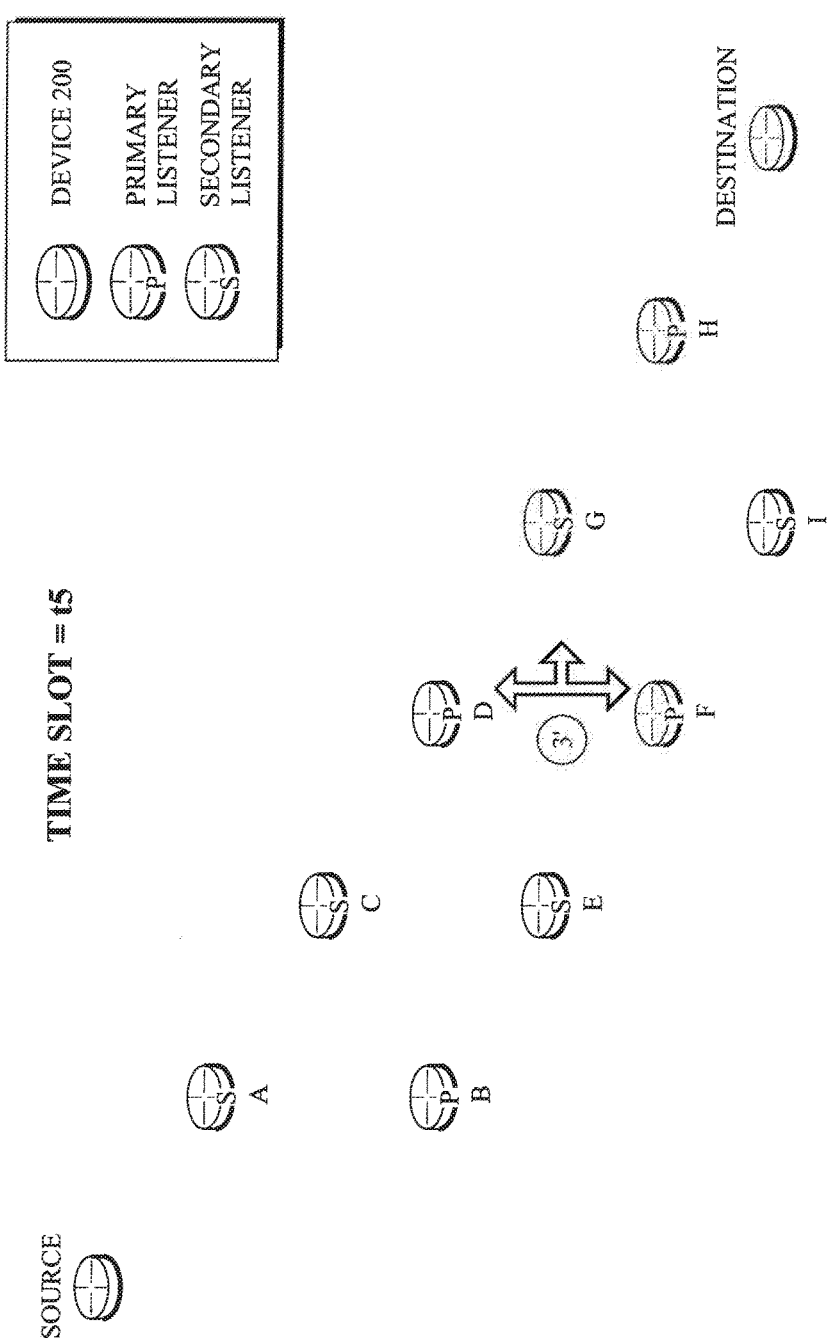
Figure 9G:
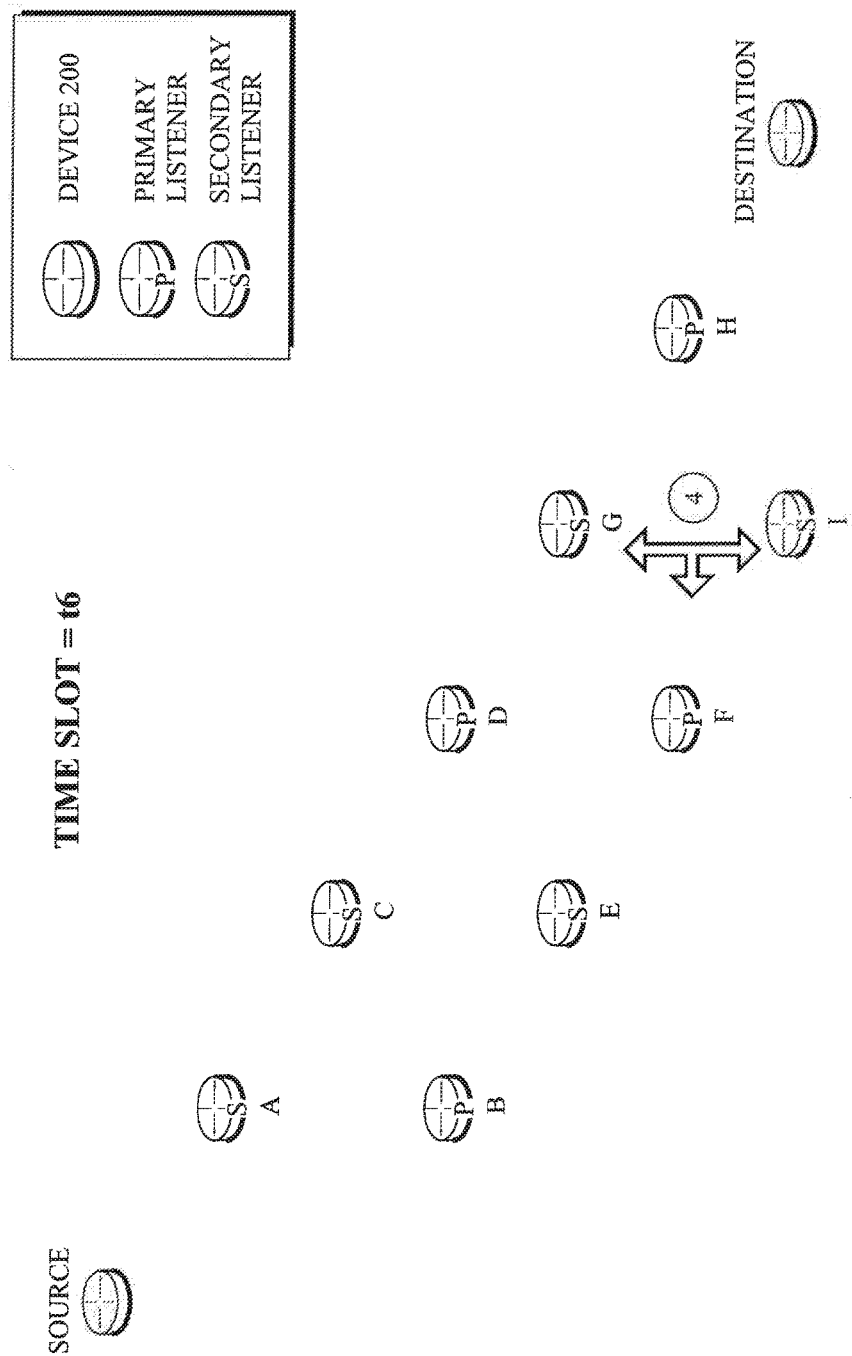
Figure 9H:
Figure 9H:
Figure 9H:
Figure 9H:
Figure 9H:
Figure 9H:
Figure 9H:
Figure 9H:
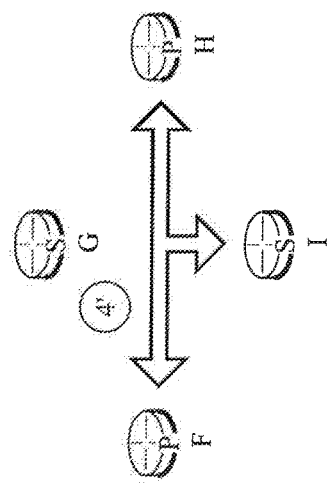
Figure 9H:
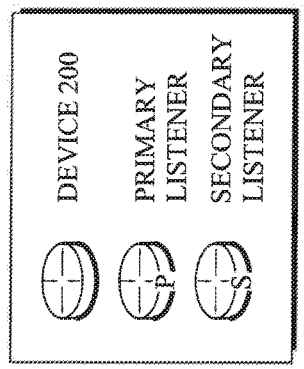
Figure 9I:
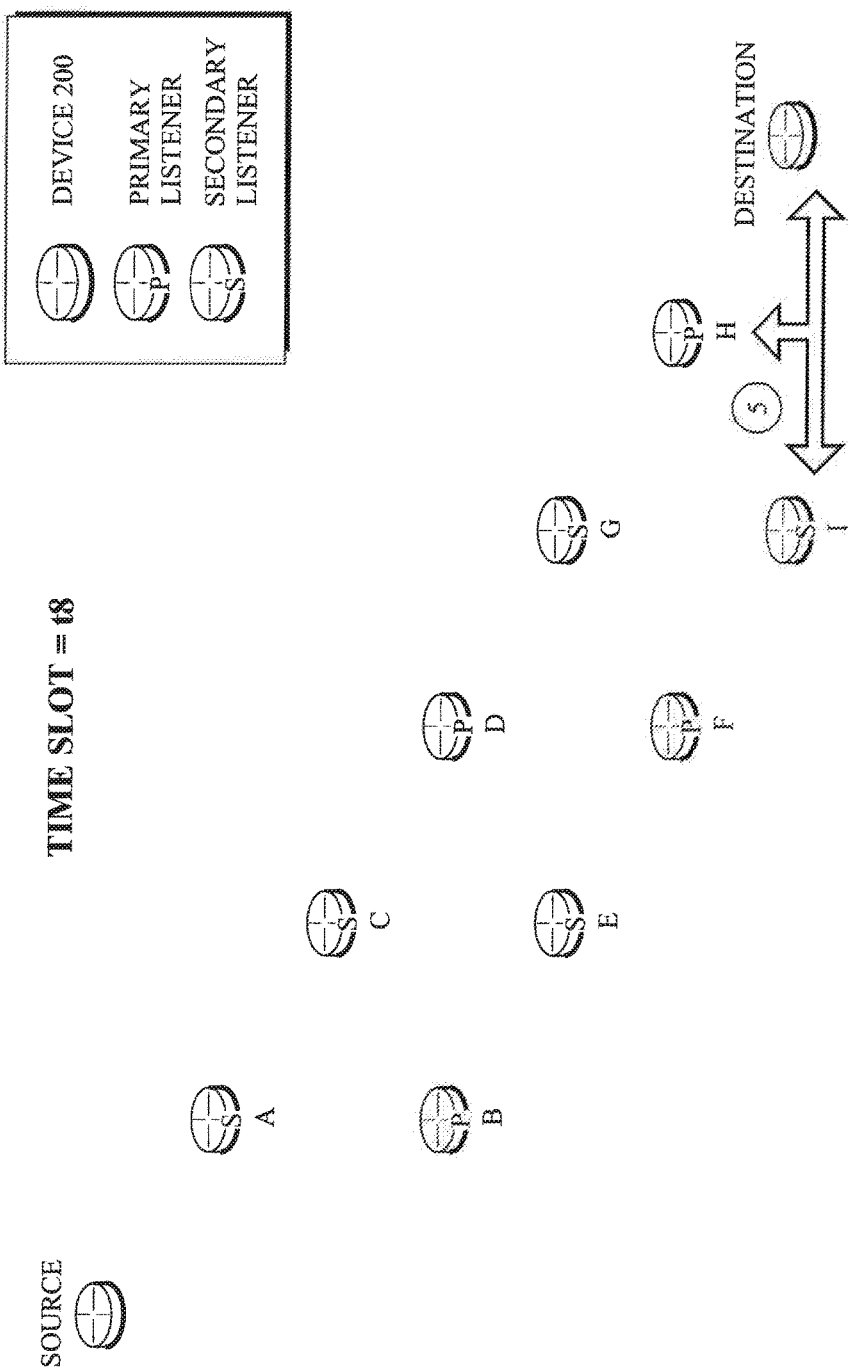
Figure 9J:
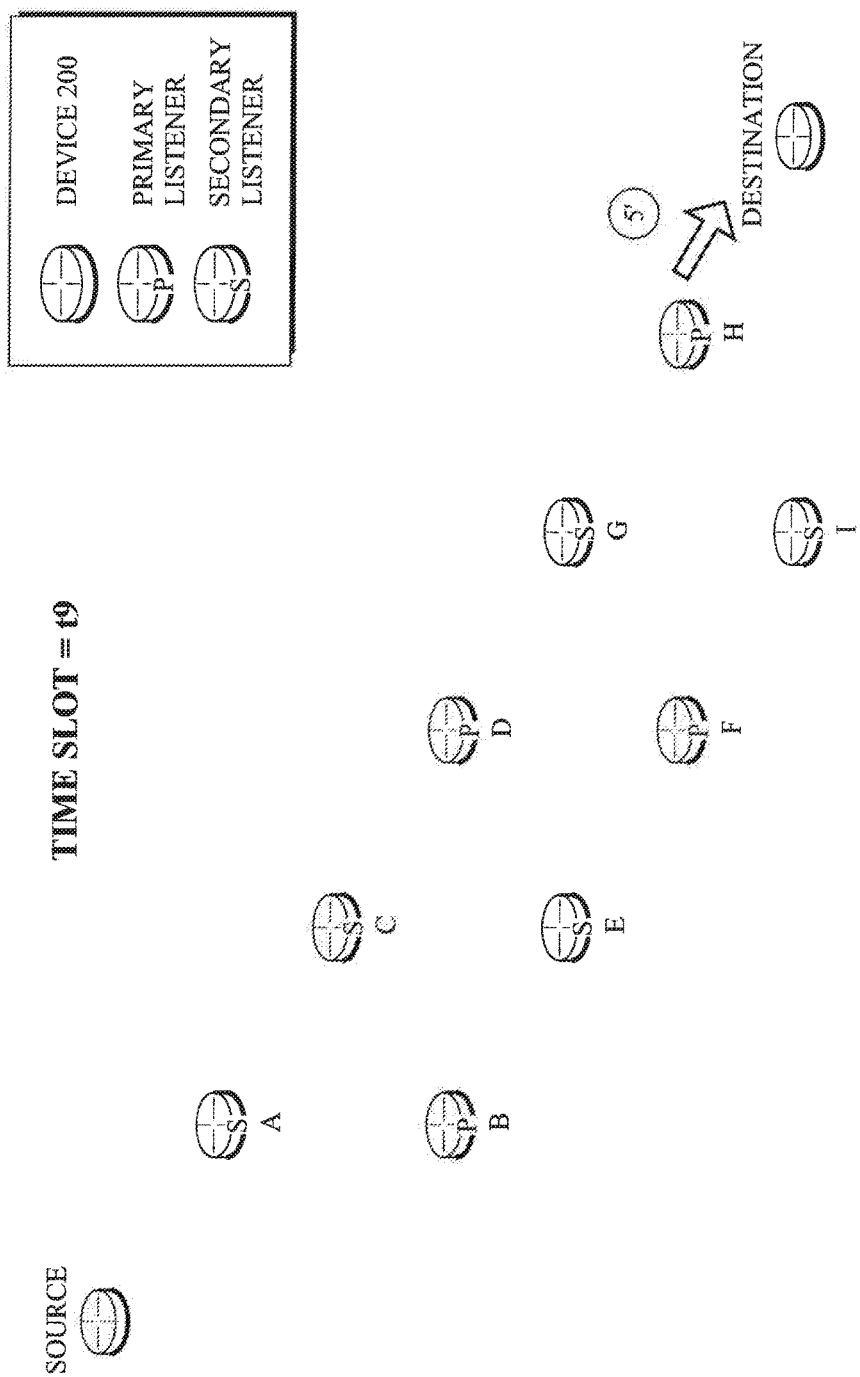

In FIGS. 9D-9E, the leapfrog process may be repeated in time slots t3 and t4. In particular, primary node B may forward the frame to primary node D during time slot t3 with secondary listener node C listening promiscuously to this transmission, as shown in FIG. 9D. Node C may also listen to determine whether or not node D acknowledges receipt of the frame sent by node B, in some embodiments. In FIG. 9E, secondary listener node C forward the frame to secondary listener node F in time slot 4, with primary node D listening in promiscuously. As noted above, such a transmission may be conditional on whether or not node D acknowledged receipt of the frame sent to it by node B.

As shown in FIGS. 9F-9I, the leapfrog process may continue on in a similar manner as described above, until the data frame is received by the final destination node either from secondary node I or from primary node H. In some embodiments, the destination node may only continue to listen if it has not already received the frame. For example, if node I was able to reach the final destination, the final destination may ignore the transmission from node H shown in FIG. 9J.

Figure 10A:
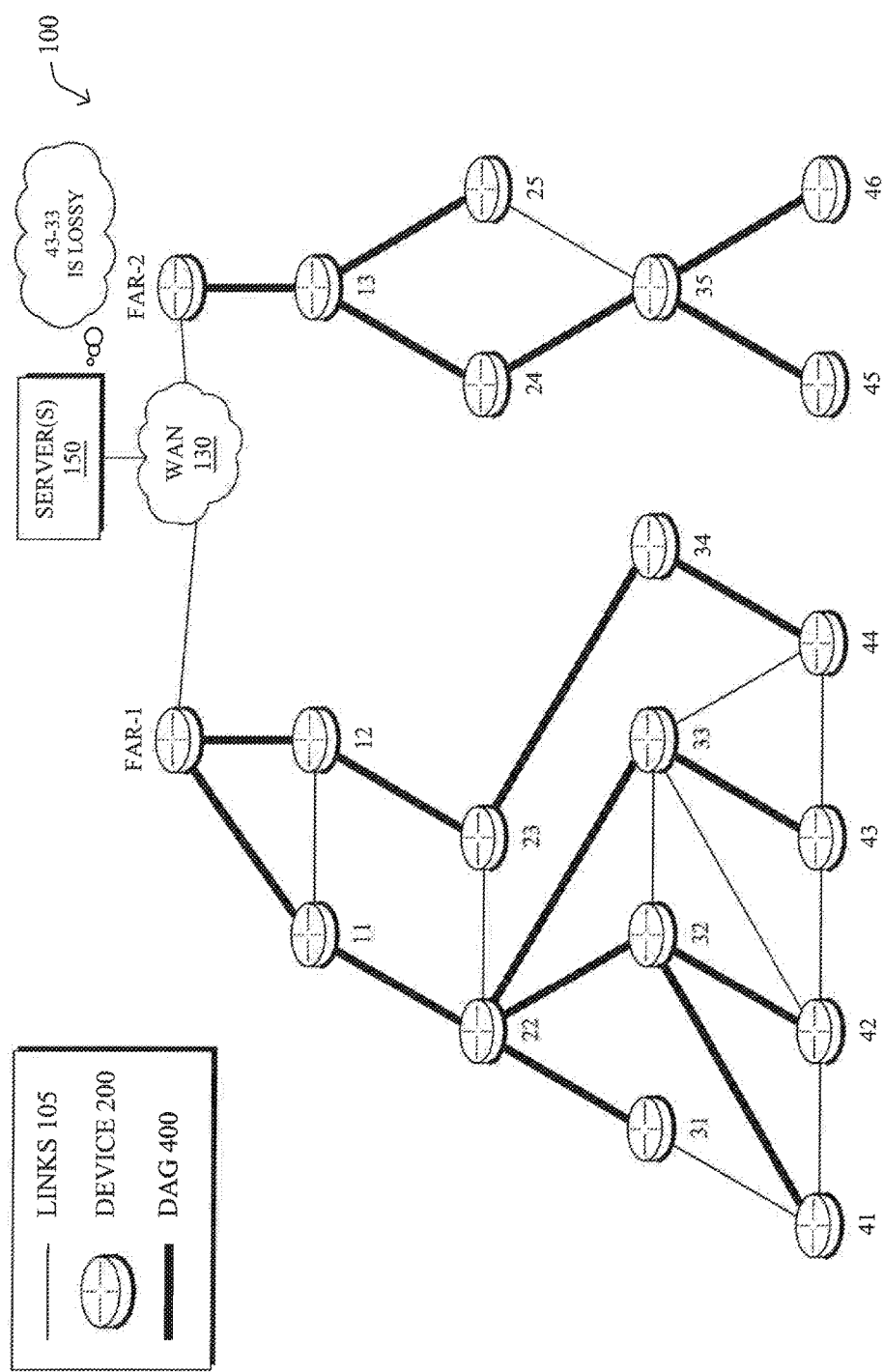
FIGS. 10A-10B illustrate an example of a central network device instructing a node to participate in a leapfrog communication process.
Figure 10B:
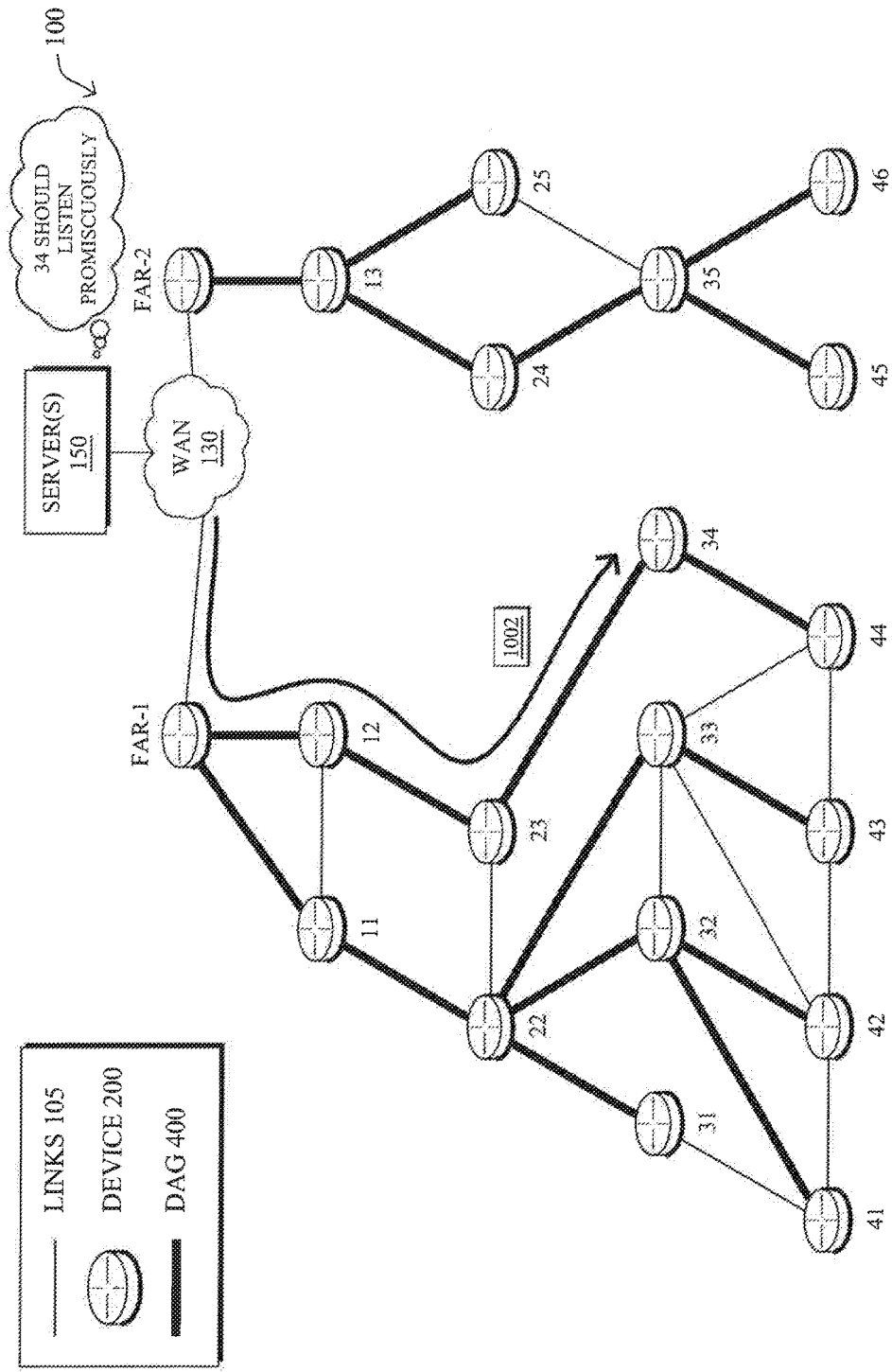

FIGS. 10A-10B illustrate an example of a central network device instructing a node to participate in a leapfrog communication process, according to some embodiments. In some cases, a central network device such as a PCE may determine that a link between a source node and another node along a primary communication path may be lossy. For example, as shown in FIG. 10A, the PCE may determine that the link between 43 and 33 is lossy (e.g., the reception probability for the link is below a threshold amount). In response, the PCE may add another node as a secondary listener node to the track to promiscuously listen to the transmission. For example, assume that node 34 is located in closer proximity to node 43 than node 33 is and has a higher reception probability. In such a case, as shown in FIG. 10B, the PCE may instruct node 34 to listen promiscuously to the transmission from node 43 to node 33 during their corresponding transmit/receive time slot. The PCE may then instruct node 34 to send the frame directly to node 33, if node 33 is the final destination of the communication. If the final destination node is even farther away than node 33 (e.g., node 22), the PCE may continue the leapfrog process by installing listener nodes as needed. Notably, the PCE may install or remove listener nodes on the fly. In other words, based on variation of the probability of a successful transmission (e.g., as a function of the ETX), the PCE may add promiscuous listener nodes on the fly between nodes that experience poor ETX.

According to some embodiments, error correction measures may also be employed in conjunction with a leapfrog mechanism, such as ARQ, forwarding equivalence class (FEC), network coding, other techniques, or combinations thereof. For example, say that one ARQ retry is added for each transmission between a source node and a primary node that has a reception probability of 33%. In such a case, 33 out of 100 frames may reach the primary node on the first try and approximately an additional 20 frames may be received on the retry, giving a total of 53 out of 100 frames received.

Now, assume that a secondary listener node in the above example is installed between the source node and the primary node with a reception probability of 80%. Of the 47 frames that were lost between the source node and the primary node and taking into account the retry, the secondary listener node will have received approximately 45 of the 47 frames. In particular, 47*0.8=37.6 frames received are received by the secondary listener on the first attempt. Of the remaining 9.4 frames that are still missing after the first attempt, 9.4*0.8=7.52 are received by the secondary listener. Thus, of the 47 frames that were not received by the primary node in either attempt, the secondary listener receives approximately 45 of these (e.g., 37.6+7.52=45.12). If the secondary listener then forwards these 45 packets to another secondary node with the primary node promiscuously listening to the transmission with a reception probability of 80%, the primary node will receive an additional 36 of the 45 frames. Thus, after only three transmissions, the primary node will have received 88 of the 100 frames sent by the source node (e.g., 33 in the first time slot, 20 in the second time slot, and 36 in the third time slot). In addition, of the 9 frames that were sent between the secondary nodes and not received by the primary node, approximately 3 will have reached the next secondary node. This means that 92 of the 100 frames sent by the source will have progressed as far as the primary node or farther after only three transmissions. Notably, this is the same result that would be achieved with classical forwarding with error correction in four transmissions, using one retry between the source and the secondary node (e.g., with 96% reception after the retry) and using a retry between the secondary node and the primary node (e.g., again with a 96% reception after the retry, giving a two hop total of 92% reception).

Figure 11:
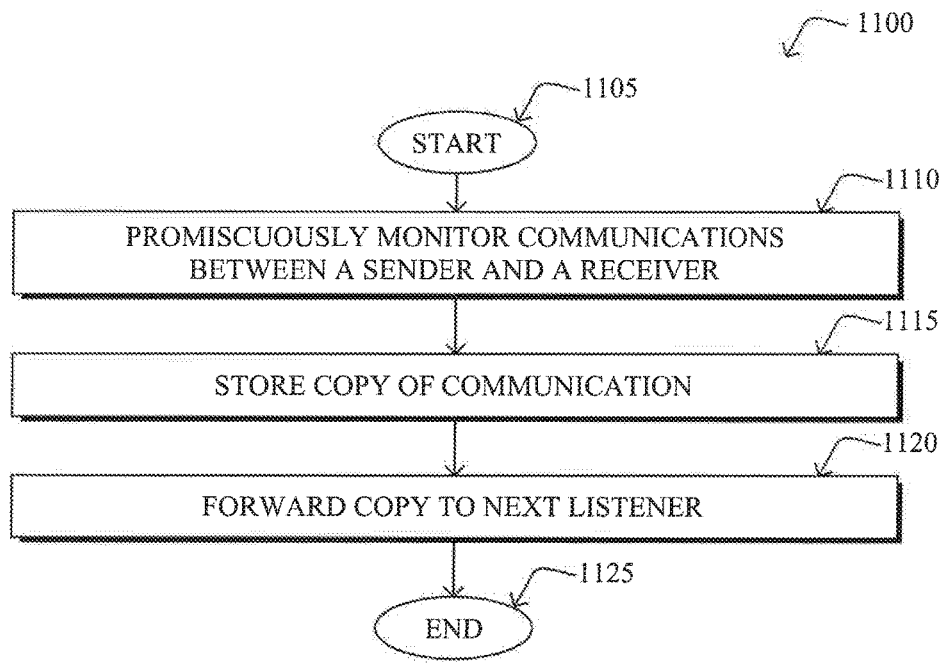
FIG. 11 illustrates an example simplified procedure for performing a leapfrog communication in a network.

FIG. 11 illustrates an example simplified procedure for performing a leapfrog communication in a network in accordance with one or more embodiments described herein. The procedure 1100 may start at step 1105, and continues to step 1110, where, as described in greater detail above, a network node promiscuously monitors a communication between a sender node and a receiver node. In various embodiments, both the sender node and the receiver node may be located along a primary communication path within the network. Notably, a sender node may be the device that originates the communication (e.g., is the originator of the communication) or may be another node farther down the communication path that is configured to forward the communication along the path to the receiver node (e.g., either the destination of the communication or another node farther down the communication path). In some cases, the receiver node may be the final destination for the communication. In further cases, the receiver node may be an intermediary node along the primary communication path that is intermediary between the sender node and the final destination for the communication. Similarly, the sender node may be the originator of the communication or may alternately be another intermediary node located along the primary path between the originator and the final destination. For example, as shown in FIG. 9B, a secondary listener node A may promiscuously listen to the transmission of a data frame from the source originator node to the intermediary node B located along the primary path. In some embodiments, the network node may only monitor the communication based on a determination that it has not already received the communication directly from the sender node (e.g., as shown in FIG. 9A).

At step 1115, the monitoring node stores a copy of a monitored communication, as described in greater detail above. For example, as shown in FIG. 9B, secondary listener node A may store a copy of a data frame sent from the source node to node B. The node may also store the copy for any length of time. For example, if the intermediary receiver node acknowledges reception of the communication, the monitoring node may delete its copy, in one embodiment. In another embodiment, the copy may be deleted by the monitoring node after the monitoring node forwards the communication to another node.

At step 1120, the monitoring node forwards the copy of the communication to another listener node, as described in greater detail above. The other listener node may also be configured to monitor communications between the intermediary receiver node and another node located along the primary communication path. For example, as shown in FIG. 9C, secondary listener node A may forward a copy of the monitored communication to another secondary listener node C. Similar to node A, node C is configured to monitor communications sent along the primary communication path between nodes B and D, as shown in FIG. 9D. In some embodiments, the monitoring node may forward the copy of the communication based on a determination that the intermediary receiver node did not acknowledge receipt of the communication. In other embodiments, the copy may always be forwarded. According to various embodiments, the intermediary receiver node is also configured to monitor this communication. Procedure 1100 then ends at step 1125.

Figure 12:
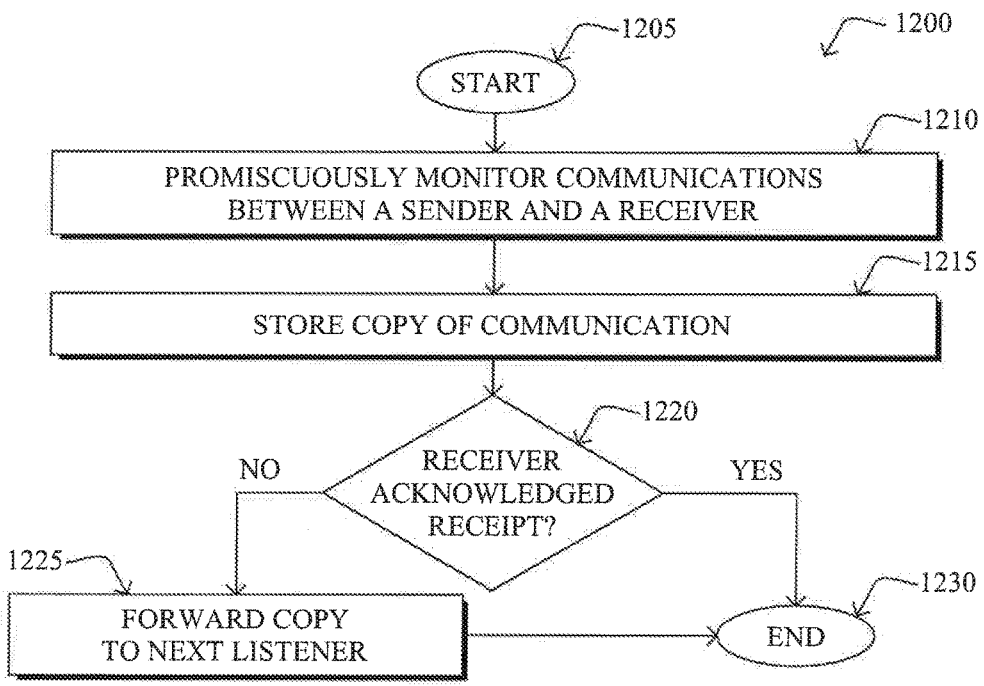
FIG. 12 illustrates an example simplified procedure fix selectively forwarding an intercepted communication in a network.

FIG. 12 illustrates an example simplified procedure for selectively forwarding an intercepted communication in a network in accordance with one or more embodiments described herein. The procedure 1200 may start at step 1205, and continues to step 1210, where, as described in greater detail above, a network node may promiscuously monitor communications sent between a sender node and a receiver node located along a primary communication path. In particular, a particular cell of a TSCH schedule (e.g., a channel and time slot combination) may be assigned to the sender node as a transmit slot, to the receiver node as a receive slot, and to the monitoring node as promiscuous listen slot.

At step 1215, the monitoring node stores a copy of the communication sent from the sender to the receiver, as detailed above. For example, the monitoring node may promiscuously listen to a transmission from the sender to the receiver and store a copy of the data frame temporarily.

At step 1220, the monitoring node may determine whether or not the receiver node acknowledged receipt of the communication to the sender node, as described in greater detail above. If the monitoring node does not hear the acknowledgement, it may treat this as an indication that the receiver node did not receive the communication from the sender. In such a case, procedure 1200 may continue on to step 1225 where the monitoring node forwards the copy of the communication to another receiver node. In some cases, the first receiver node may also be configured to promiscuously listen to this transmission. Procedure 1200 then ends at step 1230. However, if the receiver node did acknowledge receipt of the communication, the monitoring node may discard the copy of the communication and procedure 1200 then ends at step 1230.

Figure 13:
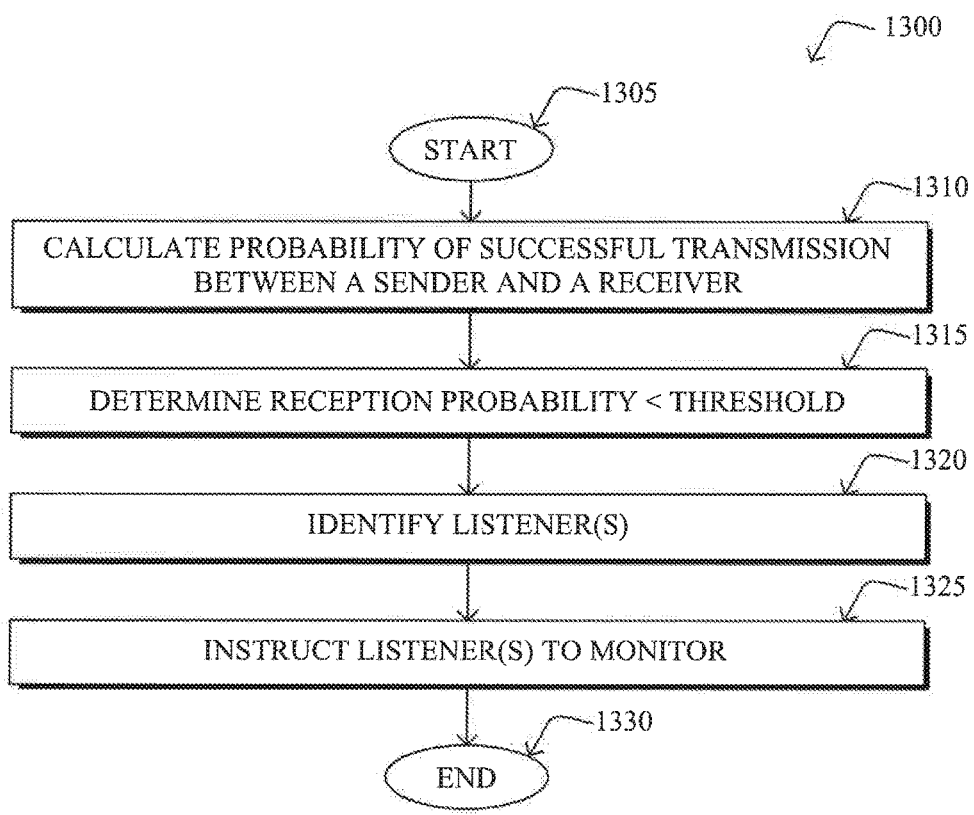
FIG. 13 illustrates an example simplified procedure for instructing a node to participate in a leapfrog communication process.

FIG. 13 illustrates an example simplified procedure for instructing a node to participate in a leapfrog communication process in accordance with one or more embodiments described herein. Procedure 1300 may be performed, for example, by a centralized networking device, such as a PCE, NMS, or the like. Procedure 1300 may start at step 1305, and continues to step 1310, where, as described in greater detail above, a probability of a successful transmission between a sender node and a receiver node is calculated. For example, an ETX metric may be determined by monitoring the link between the sender node and the receiver node (e.g., by dividing the number of successful transmissions by the total number of transmissions). Such a metric may be used to represent the probability of a successful transmission between the nodes.

At step 1315, a determination is made that the reception probability is below a threshold amount, as described in greater detail above. For example, a PCE may impose a condition on a given network path that the reception probability between the sender node and the receiver node must be above a defined threshold. Such a threshold may be set manually be a network administrator, set automatically by a machine learning process that monitors the state of the network, or in any other manner.

At step 1320, a set of one or more potential listener nodes are identified, as detailed above. In some embodiments, potential listener nodes may be identified as being within range of the sender node. The size of the set may also be controlled by a redundancy parameter that specifies the degree of redundant listeners to be used. For example, if the redundancy parameter is equal to two, the set may include a single listener. Potential listeners may also be selected based on their own reception probabilities relative to the sender node. For example, a potential listener node may be selected based on its reception probability being above a threshold value.

At step 1325, one or more listener nodes in the identified set of potential listeners is instructed to monitor the communications between the sender node and the receiver node, as described in greater detail above. For example, the TSCH schedule of a particular listener node may be adjusted such that the listener node monitors a time slot/channel used by the sender node to transmit a data frame to the receiver node. In various embodiments, a listener node may also be configured to forward a copy of a monitored data frame to another listener node (e.g., a node that is not along the primary communication path) during a subsequent time slot, while the receiver node promiscuously listens in on that communication. Procedure 1300 then ends at step 1330.

It should be noted that while certain steps within procedures 1100-1300 may be optional as described above, the steps shown in FIGS. 11-13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1100-1300 are described separately, certain steps from each procedure may be incorporated into each other procedure, and the procedures are not meant to be mutually exclusive.

The techniques described herein, therefore, provide for a leapfrog mechanism whereby network nodes are configured to promiscuously monitor communications sent from a sender node to a receiver node. A copy of the monitored frame may then be forwarded to another node, with the receiver node promiscuously listening in to the communication. By alternating the promiscuous listening and forwarding of the data frames, similar delivery ratios to an ARQ mechanism (e.g., a classical acknowledgement and retry mechanism) may be achieved, but with significantly less transmissions. Thus, less energy may be used by the nodes. When the leapfrog mechanism is combined with a classical error recovery mechanism such as ARQ, HARQ, FEC, network coding, or the like, the reception rate between nodes may be further increased.

While there have been shown and described illustrative embodiments that provide for the arbitration of time contention in a shared-media communication network, it is to be understood that various other adaptations and modifications may be made within the spirit and scope of the embodiments herein. For example, the embodiments have been shown and described herein primarily with respect to LLNs. However, the embodiments in their broader sense are not as limited, and may, in fact, be used with other types of networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
monitoring, by a network node in a computer-network, packets being sent between a sender node and an intermediary receiver node during a set of time slots of a channel hopping schedule, wherein the sender node, intermediary receiver node, and a destination node for communicating the packets are located along a primary communication path in the computer network, wherein a particular time slot is assigned to the sender node as the transmit time slot, to the intermediary receiver node as a receive time slot and to the network node as a promiscuous listen time slot;
storing, at the network node, a copy of one or more packets of the packets being sent from the sender node to the intermediary receiver node during the particular time slot; and
forwarding, by the network node, the copy to a listener node configured to monitor packets being sent between the intermediary receiver node and another node located along the primary communication path, wherein the forwarding is based on a probability of successful transmission and wherein the intermediary receiver node is configured to monitor packets being sent between the network node and the listener node and store copies of the packets being sent between the network node and the listener node.

2. The method as in claim 1, wherein the copy is forwarded to the listener node based on a determination that the intermediary receiver node has not acknowledged receipt of those particular one or more packets.

3. The method as in claim 1, wherein the sender node is configured to send the packets as unicast messages to the intermediary receiver node during the particular time slot.

4. The method as in claim 1, wherein the network node monitors the packets being sent between the sender node and the intermediary receiver node based on a determination that the network node has not already received particular packets directly from the sender node.

5. The method as in claim 1, further comprising:
receiving, at the network node and from a path computation element, an instruction to monitor the communications between the sender node and the intermediary receiver node.

6. The method as in claim 1, wherein the copy is forwarded to the listener node using a different channel than a channel used by the sender node during the particular time slot.

7. The method as in claim 1, wherein the sender node is configured to retry sending the one or more packets to the intermediary receiver node if the intermediary receiver node does not acknowledge receipt of the one or more packets.

8. A method, comprising:
calculating, by a device, a probability of successful transmission between a sender node and a receiver node located along a primary communication path between the sender node and a destination node;
determining, by the device, that the calculated probability of successful transmission between the sender node and the receiver node is below a threshold value;
in response to determining that the probability of successful transmission is below the threshold value, identifying, by the device, a set of one or more potential listener nodes within communication range of the sender node the set of one or more potential listener nodes located along a secondary communication path between the sender node and the destination node;
assigning, by the device, a particular time slot of a channel hopping schedule to the sender node as the transmit time slot, to the intermediary receiver node as a receive time slot and to a particular listener node in the identified set as a promiscuous listen time slot;
instructing, by the device, the particular listener node in the identified set to monitor data frames transmitted between the sender node and the receiver node during the particular timeslot; and
instructing, by the device, the particular listener node to store a copy of the data frames transmitted during the particular time slot and forward the copy of the data frames to another listener node located along the secondary communication path.

9. The method as in claim 8, further comprising:
instructing a plurality of listener nodes to monitor communications between the sender node and the receiver node.

10. An apparatus, comprising:
one or more network interfaces to communicate with a computer network;
a processor coupled to the network interfaces and configured to execute one or more processes; and
a memory configured to store a process executable by the processor, the process when executed operable to:
monitor packets being sent between a sender node and an intermediary receiver node during a set of time slots of a channel hopping schedule, wherein the sender node, intermediary receiver node, and a final destination node for communicating the packets are located along a primary communication path in the computer network, wherein a particular time slot is assigned to the sender node as the transmit time slot, to the intermediary receiver node as a receive time slot and to the apparatus as a promiscuous listen time slot;
store a copy of one or more of the packets being sent from the sender node to the intermediary receiver node during the particular time slot; and
forward the copy to a listener node configured to monitor packets being sent between the intermediary receiver node and another node located along the primary communication path, wherein the forwarding is based on a probability of successful transmission and wherein the intermediary receiver node is configured to monitor packets being sent between the apparatus and the listener node and store copies of the packets being sent between the apparatus and the listener node in a prior timeslot.

11. The apparatus as in claim 10, wherein the copy is forwarded to the listener node based on a determination that the intermediary receiver node has not acknowledged receipt of particular packets.

12. The apparatus as in claim 10, wherein the sender node is configured to send the packets as unicast messages to the intermediary receiver node during the particular time slot.

13. The apparatus as in claim 10, wherein the network node monitors the packets based on a determination that the network node has not already received particular packets directly from the sender node.

14. The apparatus as in claim 10, wherein the process when executed is further operable to:

receive, from a path computation element, an instruction to monitor the packets being sent between the sender node and the intermediary receiver node.

15. The apparatus as in claim 10, wherein the copy is forwarded to the listener node using a different channel than a channel used by the sender node during the particular time slot.

16. The apparatus as in claim 10, wherein the sender node is configured to retry sending the one or more packets to the intermediary receiver node if the intermediary receiver node does not acknowledge receipt of the one or more packets.

17. An apparatus, comprising:
one or more network interfaces to communicate with a network;
a processor coupled to the network interfaces and configured to execute one or more processes; and
a memory configured to store a process executable by the processor, the process when executed operable to:
calculate a probability of successful transmission between a sender node and a receiver node located along a primary communication path between the sender node and a destination node;
determine that the calculated probability of successful transmission is below a threshold value;
in response to determining that the probability of successful transmission is below the threshold value, identify a set of one or more potential listener nodes within communication range of the sender node, the set of one or more potential listener nodes located along a secondary communication path between the sender node and the destination node;
assign a particular time slot of a channel hopping schedule to the sender node as the transmit time slot, to the intermediary receiver node as a receive time slot and to a particular listener node in the identified set as a promiscuous listen time slot;
instruct the particular listener node in the identified set to monitor data frames transmitted between the sender node and the receiver node during the particular timeslot; and
instruct the particular listener node to store a copy of the data frames transmitted during the particular time slot and forward the copy of the data frames to another listener node located along the secondary communication path.

18. The apparatus as in claim 17, wherein the process when executed is further operable to:
instruct a plurality of listener nodes to monitor communications between the sender node and the receiver node.

19. A tangible, non-transitory, computer-readable media having software encoded thereon, the software when executed by a processor on a network node in a computer network, the network node operable to:
monitor packets being sent between a sender node and an intermediary receiver node during a set of time slots of a channel hopping schedule, wherein the sender node, intermediary receiver node, and a final destination node for the communicating the packets are located along a primary communication path in the computer network, wherein a particular time slot is assigned to the sender node as the transmit time slot, to the intermediary receiver node as a receive time slot and to the network node as a promiscuous listen time slot;
store a copy of one or more of the packets sent from the sender node to the intermediary receiver node during the particular time slot; and
forward the copy to a listener node configured to monitor packets being sent between the intermediary receiver node and another node located along the primary communication path, wherein the forwarding is based on a probability of successful transmission and wherein the intermediary receiver node is configured to monitor packets being sent between the network node and the listener node and store copies of the packets being sent between the network node and the listener node.

20. The tangible, non-transitory, computer-readable media as in claim 19, wherein the copy is forwarded to the listener node based on a determination that the intermediary receiver node has not acknowledged receipt of those particular one or more packets.

21. The tangible, non-transitory, computer-readable media as in claim 19, wherein the sender node is configured to send the packets as unicast messages to the intermediary receiver node during the particular time slot.

22. The tangible, non-transitory, computer-readable media as in claim 19, wherein the network node monitors the packets being sent between the sender node and the intermediary receiver node based on a determination that the network node has not already received particular packets directly from the sender node.

23. The tangible, non-transitory, computer-readable media as in claim 19, the software when executed by the processor operable to:
receive, at the network node and from a path computation element, an instruction to monitor the communications between the sender node and the intermediary receiver node.

24. A tangible, non-transitory, computer-readable media having software encoded thereon, the software when executed by a processor operable to:
calculate a probability of successful transmission between a sender node and a receiver node located along a primary communication path between the sender node and a destination node;
determine that the calculated probability of successful transmission is below a threshold value;
in response to determining that the probability of successful transmission is below the threshold value, identify a set of one or more potential listener nodes within communication range of the sender node, the set of one or more potential listener nodes located along a secondary communication path between the sender node and the destination node;
assign a particular time slot of a channel hopping schedule to the sender node as the transmit time slot, to the intermediary receiver node as a receive time slot and to a particular listener node in the identified set as a promiscuous listen time slot;
instruct the particular listener node in the identified set to monitor data frames transmitted between the sender node and the receiver node during the particular timeslot; and
instruct the particular listener node to store a copy of the data frames transmitted during the particular time slot and forward the copy of the data frames to another listener node located along the secondary communication path.

* * * * *

UNITED STATES PATENT AND TRADEMARK OFFICE
CERTIFICATE OF CORRECTION

PATENT NO. : 10,038,608 B2
APPLICATION NO. : 14/336005
DATED : July 31, 2018
INVENTOR(S) : Pascal Thubert et al.

It is certified that error appears in the above-identified patent and that said Letters Patent is hereby corrected as shown below:

In the Specification

In Column 2, Line 8, please amend as shown:
FIG. 12 illustrates an example simplified procedure for In Column 11, Line 52, please amend as shown:
the time of creation of CDU matrix 500) and the 802.15.4e In Column 13, Line 57, please amend as shown:
progress by at least a short step, if the data frame is lost for In Column 14, Line 41, please amend as shown:
parameter n may be set between a value of 2 and 4 (e.g., to In Column 16, Line 60, please amend as shown:
listener node E in time slot 4, with primary note D listening Signed and Sealed this
Twentieth Day of October, 2020

Andrei Iancu
*Director of the United States Patent and Trademark Office*